United States Patent
Tonosaki et al.

(10) Patent No.: US 11,233,236 B2
(45) Date of Patent: Jan. 25, 2022

(54) ELECTRODE ACTIVE MATERIAL FOR SODIUM SECONDARY BATTERY, ELECTRODE FOR SODIUM SECONDARY BATTERY, SODIUM SECONDARY BATTERY AND METHOD FOR PRODUCING COMPOSITE METAL OXIDE

(71) Applicant: SUMITOMO CHEMICAL COMPANY, LIMITED, Tokyo (JP)

(72) Inventors: Kiwamu Tonosaki, Tsukuba (JP); Takuya Matsunaga, Tsukuba (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 132 days.

(21) Appl. No.: 16/497,525

(22) PCT Filed: Mar. 28, 2018

(86) PCT No.: PCT/JP2018/012716
§ 371 (c)(1),
(2) Date: Sep. 25, 2019

(87) PCT Pub. No.: WO2018/181461
PCT Pub. Date: Oct. 4, 2018

(65) Prior Publication Data
US 2020/0119347 A1    Apr. 16, 2020

(30) Foreign Application Priority Data
Mar. 29, 2017    (JP) .............................. JP2017-065025

(51) Int. Cl.
*H01M 4/00* (2006.01)
*H01M 4/505* (2010.01)
(Continued)

(52) U.S. Cl.
CPC .......... *H01M 4/505* (2013.01); *H01M 4/485* (2013.01); *H01M 4/525* (2013.01); *H01M 10/054* (2013.01)

(58) Field of Classification Search
CPC ...... H01M 4/505; H01M 4/485; H01M 4/525; H01M 10/054; C01P 2002/74;
(Continued)

(56) References Cited

U.S. PATENT DOCUMENTS 7,794,879 B2 * 9/2010 Yamaki .................. H01M 4/52
429/221
2010/0323232 A1    12/2010 Kuze et al.
(Continued)

FOREIGN PATENT DOCUMENTS

CN    104795560 A    7/2015
CN    106328928 A    1/2017
(Continued)

OTHER PUBLICATIONS

Dingding Yuan et al.: "Synthesis and electrochemical behaviors of layered Na0.67 [Mn0.65Co0.2Ni0.15] O2 microflakes as a stable cathode material for sodium-ion batteries" Journal of Materials Chemistry A, vol. 1, No. 12, Jan. 17, 2013 (Jan. 17, 2013), p. 3895.
(Continued)

*Primary Examiner* — Nicholas P D'Aniello
(74) *Attorney, Agent, or Firm* — McDermott Will & Emery LLP

(57) ABSTRACT

The present invention relates to an electrode active material for a sodium secondary battery, including: a composite metal oxide, in which the composite metal oxide is represented by Formula (1), and in a case where a peak intensity of a (200) plane of nickel oxide which is observed in the vicinity of 43° of a powder X-ray diffraction spectrum is set as I, and a peak intensity of a (104) plane of the composite metal oxide
(Continued)

represented by Formula (1) which is observed in the vicinity of 41° to 42.5° is set as $I_0$, $I/I_0$ obtained by dividing I by $I_0$ is 0.2 or less.

10 Claims, 8 Drawing Sheets

(51) Int. Cl.
*H01M 4/485* (2010.01)
*H01M 4/525* (2010.01)
*H01M 10/054* (2010.01)

(58) Field of Classification Search
CPC .............. C01P 2002/20; C01P 2002/52; C01P 2002/54; C01P 2002/72; C01P 2004/03; C01P 2004/61; C01G 53/50; C01G 53/66; Y02E 60/10
See application file for complete search history.

(56) References Cited

U.S. PATENT DOCUMENTS

| | | |
|---|---|---|
| 2011/0305947 A1 | 12/2011 | Song et al. |
| 2012/0015230 A1 | 1/2012 | Kuze et al. |
| 2014/0197358 A1 | 7/2014 | Nose |
| 2016/0293945 A1 | 10/2016 | Hu et al. |

FOREIGN PATENT DOCUMENTS

| | | |
|---|---|---|
| EP | 2242131 A1 | 10/2010 |
| JP | 2009-209038 A | 9/2009 |
| JP | 2010-235434 A | 10/2010 |
| JP | 2011-236117 A | 11/2011 |
| JP | 2012-004110 A | 1/2012 |
| JP | 2014-010973 A | 1/2014 |
| JP | 2014-160653 A | 9/2014 |
| JP | 2015-170567 A | 9/2015 |
| WO | 2013/031331 A1 | 3/2013 |

OTHER PUBLICATIONS

Daniel Buchholz et al.: "Water sensitivity of layered P2/P3-Na x Ni 0 22 Co 0 11 Mn 0.66 O2 cathode material", Journal of Materials Chemistry A, vol. 2, No. 33, Jun. 25, 2014 (Jun. 25, 2014), p. 13415.
Extend European Search Report issued in corresponding European Patent Application No. 18776263.8-1103, dated Nov. 5, 2020.
International Search Report issued in corresponding International Patent Application No. PCT/JP2018/012716, dated Jun. 26, 2018, with English translation.

\* cited by examiner

ELECTRODE ACTIVE MATERIAL FOR SODIUM SECONDARY BATTERY, ELECTRODE FOR SODIUM SECONDARY BATTERY, SODIUM SECONDARY BATTERY AND METHOD FOR PRODUCING COMPOSITE METAL OXIDE

CROSS REFERENCE

This application is the U.S. National Phase under 35 § 371 of International Application No. PCT/JP2018/012716, filed on Mar. 28, 2018, which claims the benefit of Japanese Application No. 2017-065025, filed on Mar. 29, 2017, the entire contents of each are hereby incorporated by reference.

TECHNICAL FIELD

The present invention relates to an electrode active material for a sodium secondary battery, an electrode for a sodium secondary battery, a sodium secondary battery, and a method for producing a composite metal oxide.

Priority is claimed on Japanese Patent Application No. 2017-065025, filed on Mar. 29, 2017, the content of which is incorporated herein by reference.

BACKGROUND ART

In recent years, lithium secondary batteries have been put into practical use as secondary batteries and the applications thereof have been expanding. However, lithium resources used in lithium secondary batteries cannot be said to be abundant. There is concern of depletion of lithium resources in the future.

On the other hand, resources of sodium, which is also an alkali metal, are abundant compared to lithium and are less expensive than lithium by one digit. Further, it is considered that since sodium has a relatively high standard potential, sodium secondary batteries may become high-capacity secondary batteries.

In a case where sodium secondary batteries can be used in place of current lithium secondary batteries, for example, mass production of large-sized secondary batteries such as automotive secondary batteries or distributed power storage secondary batteries can be made without concern of depletion of resources.

For example, Patent Document 1 suggests a composite metal oxide which can provide a sodium secondary battery having a high energy density. An active material described in Patent Document 1 is formed of a composite metal oxide containing sodium, manganese, and copper. Patent Document 1 describes that generation of a crystal phase such as a copper oxide is suppressed by setting the content of copper in the composite metal oxide to a specific amount or less.

CITATION LIST

Patent Literature

[Patent Document 1] Japanese Unexamined Patent Application, First Publication No. 2014-10973

DISCLOSURE OF INVENTION

Technical Problem

However, the water resistance of the sodium-containing composite metal oxide described in Patent Document 1 is insufficient. In other words, the sodium-containing composite metal oxide may deteriorate after reacting with the moisture in air or a slight amount of moisture contained in a solvent used for forming an electrode and releasing sodium in the sodium-containing composite metal oxide. As a result, the discharge capacity of a sodium secondary battery obtained by using the sodium-containing composite metal oxide described in Patent Document 1 as a positive electrode active material is degraded in some cases.

Further, the sodium in the sodium-containing composite metal oxide described in Patent Document 1 is released as sodium hydroxide in a case of reacting with the moisture. Therefore, in a case where an electrode mixture paste containing a sodium-containing compound as an electrode active material is prepared, the material constituting the mixture paste reacts with sodium hydroxide and this results in gelation of the electrode mixture paste. Therefore, the application of the electrode mixture paste may become difficult in some cases. The present invention has been made in consideration of the above-described circumstances, and an object thereof is to provide an electrode active material for a sodium secondary battery with sufficient water resistance, an electrode for a sodium secondary battery, a sodium secondary battery, and a method for producing a composite metal oxide.

Solution to Problem

The present invention includes the following aspects [1] to [10].

[1] An electrode active material for a sodium secondary battery, including: a composite metal oxide, in which the composite metal oxide is represented by Formula (1), and in a case where a peak intensity of a (200) plane of nickel oxide which is observed in the vicinity of 43° of a powder X-ray diffraction spectrum is set as I, and a peak intensity of a (104) plane of the composite metal oxide represented by Formula (1) which is observed in the vicinity of 41° to 42.5° is set as $I_0$, $I/I_0$ obtained by dividing I by $I_0$ is 0.2 or less.

$$Na_aM^1_rM_bNi_eSi_cO_d \quad (1)$$

(M represents one or more elements selected from the group consisting of B, Ti, Mn, Fe, and Co, $M^1$ represents one or more elements selected from the group consisting of Mg, Ca, and Sr, and relations $0 \leq r \leq 0.1$, $0.5 \leq a \leq 1.0$, $0 < c < 0.1$, $0.5 < b+c \leq 1.1$, $0 < e \leq 0.5$, and $1.95 < d < 2.05$ are satisfied)

[2] The electrode active material for a sodium secondary battery according to [1], in which M in Formula (1) contains at least one element selected from the group consisting of Ti, Mn, and Fe.

[3] The electrode active material for a sodium secondary battery according to [1] or [2], in which a crystal structure of the composite metal oxide represented by Formula (1) has a layered structure.

[4] An electrode including: the electrode active material for a sodium secondary battery according to any one of [1] to [3].

[5] A sodium secondary battery including: the electrode according to [4].

[6] A method for producing a composite metal oxide, including: a mixing step of mixing a Na-containing compound, a Ni-containing compound, an M-containing compound (M represents any one or more elements selected from the group consisting of B, Ti, Mn, Fe, and Co), and a Si-containing compound to obtain a mixture; and a calcination step of calcining powder containing the mixture, in which the mixing is carried out such that the mass of the Si-containing compound is set to be greater than 0 and less than or equal to 3 parts by mass in a case where a total mass of the Na-containing compound, the Ni-containing compound, and the M-containing compound is set to 100 parts by mass.

[7] The method for producing a composite metal oxide according to [6], in which the Si-containing compound is a silicon-containing oxide.

[8] The method for producing a composite metal oxide according to [6] or [7], in which the M-containing compound contains at least one element selected from the group consisting of Ti, Mn, and Fe.

[9] The method for producing a composite metal oxide according to any one of [6] to [8], in which a calcination temperature in the calcination step is higher than or equal to 800° C. and lower than or equal to 1000° C.

[10] The method for producing a composite metal oxide according to [9], in which a holding time at the temperature higher than or equal to 800° C. and lower than or equal to 1000° C. in the calcination step is longer than or equal to 4 hours and shorter than or equal to 20 hours.

Advantageous Effects of Invention

According to the present invention, it is possible to provide an electrode active material for a sodium secondary battery with sufficient water resistance, an electrode for a sodium secondary battery, a sodium secondary battery, and a method for producing a composite metal oxide.

Since the electrode active material for a sodium secondary battery according to the present invention is unlikely to react with the moisture in air due to high water resistance thereof, degradation of the discharge capacity caused by the elution of sodium can be suppressed. Further, since generation of sodium hydroxide which may react with the moisture in air and cause gelation can be suppressed, gelation is unlikely to occur, and the coatability of an electrode paste at the time of application can be improved.

BEST MODE CARRYING OUT THE INVENTION

Figure 1A:
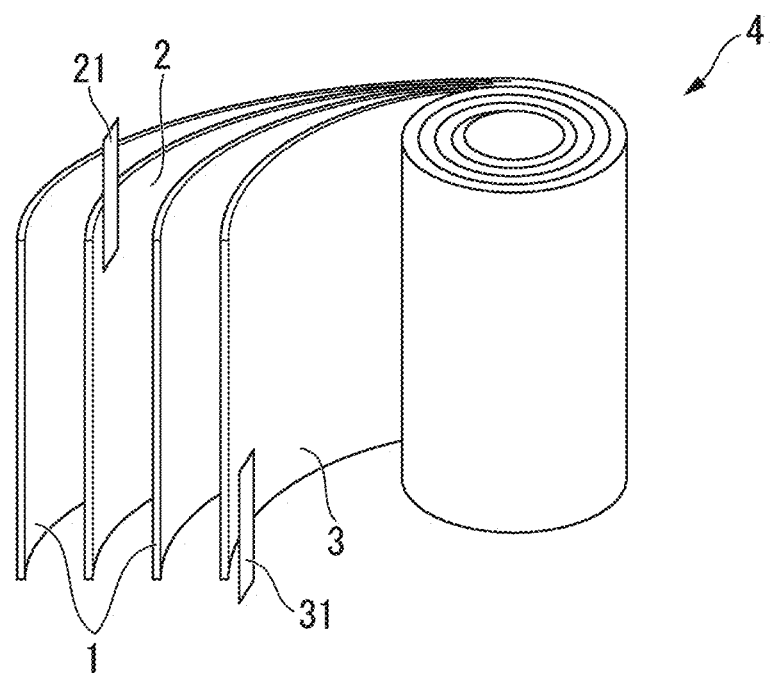
FIG. 1A is a schematic configuration view showing an example of a sodium secondary battery.

<Electrode Active Material for Sodium Secondary Battery>

The present invention relates to an electrode active material for a sodium secondary battery, including: a composite metal oxide, in which the composite metal oxide is represented by Formula (1), and in a case where a peak intensity of a (200) plane of nickel oxide which is observed in the vicinity of 43° of a powder X-ray diffraction spectrum is set as I, and a peak intensity of a (104) plane of the composite metal oxide which is observed in the vicinity of 41° to 42.5° and is represented by Formula (1) is set as $I_0$, $I/I_0$ obtained by dividing I by $I_0$ is 0.2 or less.

$$Na_aM^1{}_rM_bNi_eSi_cO_d \qquad (1)$$

M represents one or more elements selected from the group consisting of B, Ti, Mn, Fe, and Co, $M^1$ represents one or more elements selected from the group consisting of Mg, Ca, and Sr, and relations $0 \leq r \leq 0.1$, $0.5 \leq a \leq 1.0$, $0 < c < 0.1$, $0.5 < b+c \leq 1.1$, $0 < e \leq 0.5$, and $1.95 < d < 2.05$ are satisfied.

$I/I_0$

In the powder X-ray diffraction measurement using CuKα rays performed on the composite metal oxide contained in the electrode active material for a sodium secondary battery (hereinafter, also referred to as an "electrode active material") according to the present embodiment, in a case where the peak intensity of a (200) plane of nickel oxide which is a by-product and is observed in the vicinity of 43° is set as I, and the peak intensity of a (104) plane of the composite metal oxide which is observed in the vicinity of 41° to 42.5° and is represented by Formula (1) is set as $I_0$, $I/I_0$ obtained by dividing I by $I_0$ is 0.2 or less, preferably 0.1 or less, and more preferably 0.07 or less.

According to another aspect of the present invention, $I/I_0$ is preferably greater than or equal to 0.015 and less than or equal to 0.2, more preferably greater than or equal to 0.015 and less than or equal to 0.1, and still more preferably greater than or equal to 0.015 and less than or equal to 0.07.

Formula (1)

The composite metal oxide contained in the electrode active material according to the present embodiment is represented by Formula (1).

$$Na_aM^1{}_rM_bNi_eSi_cO_d \qquad (1)$$

(M represents one or more elements selected from the group consisting of B, Ti, Mn, Fe, and Co, $M^1$ represents one or more elements selected from the group consisting of Mg, Ca, and Sr, and relations $0 \leq r \leq 0.1$, $0.5 \leq a \leq 1.0$, $0 < c < 0.1$, $0.5 < b+c \leq 1.1$, $0 < e \leq 0.5$, and $1.95 < d < 2.05$ are satisfied)

[M]

In Formula (1), M represents one or more elements selected from the group consisting of boron (B), titanium (Ti), manganese (Mn), iron (Fe), and cobalt (Co), and it is preferable that M includes at least one element selected from the group consisting of Ti, Mn, and Fe.

$[M^1]$

In Formula (1), $M^1$ represents any one or more elements selected from the group consisting of magnesium (Mg), calcium (Ca), and strontium (Sr).

[a]

In a case where a in Formula (1) is 0.5 or greater, the capacity of the sodium secondary battery containing an electrode material to be obtained is large, and the energy density is increased. Further, in a case where a is greater than 1.0, impurities such as sodium carbonate are easily mixed into an electrode material to be obtained, the resistance of the sodium battery containing the electrode material is large, and the energy density is decreased. In other words, in a case where a is 1.0 or less, since impurities such as sodium carbonate are unlikely to be mixed into an electrode material to be obtained, the resistance of the sodium battery is decreased, and the energy density is increased.

[c]

In a case where c in Formula (1) is greater than 0, an electrode active material having excellent water resistance is easily obtained. Further, in a case where c is less than 0.1, the discharge capacity in the sodium secondary battery containing a positive electrode active material for a sodium secondary battery to be obtained is increased.

In order to allow the electrode active material according to the present embodiment to have improved water resistance, c is preferably 0.001 or greater and more preferably 0.0015 or greater. Further, in order to increase the discharge capacity in the sodium secondary battery containing the positive electrode active material for a sodium secondary battery to be obtained, c is preferably 0.09 or less and more preferably 0.05 or less. The upper limit and the lower limit of c can be optionally combined.

In the present embodiment, c in Formula (1) is preferably greater than or equal to 0.2 and less than or equal to 0.5.

According to another aspect of the present invention, c is preferably greater than or equal to 0.001 and less than or equal to 0.09 and more preferably greater than or equal to 0.0015 and less than or equal to 0.05.

[b+c]

In a case where b+c in Formula (1) is greater than 0.5, the discharge capacity in the sodium secondary battery containing the positive electrode active material for a sodium secondary battery to be obtained is increased. Further, in a case where b+c is less than or equal to 1.1, an electrode active material having only an $\alpha$-NaFeO$_2$ type crystal structure tends to be obtained, and the energy density is increased.

[e]

In Formula (1), e is greater than 0 and less than or equal to 0.5, preferably less than or equal to 0.4, and more preferably less than or equal to 0.3. e is preferably greater than or equal to 0.1 and more preferably greater than or equal to 0.15.

According to another aspect of the present invention, e is preferably greater than 0 and less than or equal to 0.5, more preferably greater than or equal to 0.1 and less than or equal to 0.4, and still more preferably greater than or equal to 0.15 and less than or equal to 0.3.

[d]

In a case where d in Formula (1) is greater than 1.95, the capacity of the sodium secondary battery containing an electrode material to be obtained is large, and the energy density is increased. Further, in a case where d is less than 2.05, an electrode active material having only an $\alpha$-NaFeO$_2$ type crystal structure tends to be obtained.

[r]

In a case where r is 0 or greater, the energy density can be increased. In a case where r is 0.1 or less, the discharge capacity is increased. In the present embodiment, r is preferably greater than or equal to 0.01 and less than or equal to 0.05.

In the present specification, the values of a, r, b, e, and c can be acquired by high frequency inductively coupled plasma emission spectrometry (ICP-AES). Specifically, the values can be acquired by measuring a solution obtained by performing a heat contact treatment on the electrode active material using hydrochloric acid so as to be dissolved therein according to ICP-AES.

The electrode active material according to the present embodiment has preferably a layered structure and preferably an $\alpha$-NaFeO$_2$ type crystal structure which is a layered rock salt type crystal structure. The layered structure can be confirmed by analyzing the electrode active material based on powder X-ray diffraction spectrum.

Therefore, sodium ions can be satisfactorily doped or dedoped at the time of driving the sodium secondary battery containing the electrode active material to be obtained.

The electrode active material according to the present embodiment has an impurity compound and an impurity phase such as nickel oxide in some cases, but preferably has an $\alpha$-NaFeO$_2$ type crystal structure in the crystal. Further, it is preferable that the electrode active material according to the present embodiment is a single-phase electrode active material having only an $\alpha$-NaFeO$_2$ type crystal structure.

<Method for Producing Composite Metal Oxide>

The present embodiment relates to a method for producing a composite metal oxide, including: a mixing step of mixing a sodium (Na)-containing compound, a nickel (Ni)-containing compound, an M-containing compound (M represents any one or more elements selected from the group consisting of B, Ti, Mn, Fe, and Co), and a silicon (Si)-containing compound to obtain a mixture; and a step of calcining powder containing the mixture, in which the mass of the silicon-containing compound is greater than 0 and less than or equal to 3 parts by mass in a case where the total mass of the sodium-containing compound, the nickel-containing compound, and the M-containing compound is set to 100 parts by mass.

In the present embodiment, first, a sodium-containing compound, a nickel-containing compound, an M-containing compound (M represents any one or more elements selected from the group consisting of B, Ti, Mn, Fe, and Co), and a silicon-containing compound are mixed to obtain a mixture. At this time, the mixing is carried out such that the mass of the silicon-containing compound is set to be greater than 0 and less than or equal to 3 parts by mass in a case where the total mass of the sodium-containing compound, the nickel-containing compound, and the M-containing compound is set to 100 parts by mass. At this time, an $M^1$-containing compound ($M^1$ represents any one or more elements selected from the group consisting of Mg, Ca, and Sr) may be optionally added. Further, other compounds may be added to the mixture within the range where the effects of the present invention are not lost.

Next, a composite metal oxide is produced by calcining the mixture.

Specifically, first, a metal element contained in a target composite metal oxide is prepared as a metal-containing compound containing the metal element.

Next, the metal-containing compound is weighed so as to have a composition corresponding to a desired metal element ratio and mixed to obtain a mixture.

Next, a composite metal oxide can be produced by calcining the obtained mixture.

Examples of the metal-containing compound include a compound which can be changed to an oxide at a high temperature by being combined with oxygen molecules in the atmosphere or oxygen atoms contained therein such as an oxide, a hydroxide, a carbonate, a nitrate, a halide, or an oxalate.

Na-Containing Compound

Examples of the Na-containing compound used as a raw material in the present embodiment include one or more compounds selected from the group consisting of sodium hydroxide (NaOH), sodium chloride (NaCl), sodium nitrate ($NaNO_3$), sodium peroxide ($NaO_2$), sodium sulfate ($Na_2SO_4$), sodium bicarbonate ($NaHCO_3$), sodium oxalate ($Na_2C_2O_4$), and sodium carbonate ($Na_2CO_3$). These compounds may be hydrates.

Among these, sodium carbonate is preferable from the viewpoints of low hygroscopicity and excellent handleability. Further, sodium hydroxide is preferable from the viewpoint that the reactivity at a low temperature is high, sodium hydroxide can be calcined at a relatively low calcination temperature, and thus the production cost can be lowered.

Ni-Containing Compound

Nickel (II) oxide (NiO) or nickel (II, III) oxide ($Ni_2O_3$) is preferable as the Ni compound.

M-Containing Compound

The "M-containing compound" indicates a compound containing any one or more elements selected from the group consisting of B, Ti, Mn, Fe, and Co. In the present embodiment, it is preferable that the M-containing compound contains at least one element selected from the group consisting of Ti, Mn, and Fe. Boron oxide or boric acid is preferable as the boron-containing compound, titanium (IV) oxide ($TiO_2$) is preferable as the Ti-containing compound, manganese (IV) oxide ($MnO_2$) is preferable as the Mn-containing compound, iron (II, III) oxide ($Fe_3O_4$) or iron (III) oxide ($Fe_2O_3$) is preferable as the Fe compound, and cobalt (II, III) oxide ($Co_3O_4$) is preferable as the Co compound.

The M-containing compound may be added to the mixture so as to have a desired metal element ratio and may be a component derived from a metal oxide added as a melting type reaction accelerator.

$M^1$-Containing Compound

The $M^1$-containing compound is a compound containing any one or more elements selected from the group consisting of Mg, Ca, and Sr. As the Mg-containing compound, magnesium carbonate, magnesium hydroxide, or magnesium oxide is preferable. As the Ca-containing compound, calcium carbonate, calcium hydroxide, or calcium oxide is preferable. As the Sr-containing compound, strontium carbonate, strontium hydroxide, or strontium oxide is preferable.

Si-Containing Compound

Examples of the Si-containing compound include silicic acid, silicate, silicon oxide, silicon halide, dry silica, tetraalkyl orthosilicic acid ester, and colloidal silica. Among these, dry silica is preferable.

In the present embodiment, it is preferable that the Si-containing compound is a silicon-containing oxide. Examples of the silicon-containing oxide include silicic acid, silicate, silicon oxide, and dry silica.

In the present embodiment, in a case where dry silica is used as the silicon-containing compound, the particle diameter of the dry silica is, for example, 15 μm or less, or 10 μm or less.

In the present embodiment, the Si-containing compound is mixed into the mixture such that the amount of the Si-containing compound is set to be greater than 0 and less than or equal to 3 parts by mass, preferably 2.5 parts by mass or less, and more preferably 2.0 parts by mass or less with respect to 100 parts by mass which is the total mass of the Na-containing compound, the Ni-containing compound, and the M-containing compound.

By mixing the Si-containing compound such that the content thereof is set to be less than or equal to the above-described upper limit, a composite metal oxide with sufficient water resistance can be produced. In a case where the Si-containing compound whose content is greater than the above-described upper limit is added to the mixture, the reactivity of the metal-containing compound used as a raw material is degraded, the yield of a desired composite metal oxide is decreased, and nickel oxide may be mixed as an impurity. In other words, a peak intensity I of the (200) plane of nickel oxide which is observed in the vicinity of 43° of the powder X-ray diffraction spectrum tends to be increased. On the contrary, the peak intensity I tends to be decreased by setting the amount of the Si-containing compound to be added to be in the above-described range.

The lower limit of the amount of the silicon-containing compound to be mixed is not particularly limited. For example, the lower limit thereof is 0.1 parts by mass or greater, 0.2 parts by mass or greater, or 0.3 parts by mass or greater.

According to another aspect of the present invention, the Si-containing compound is mixed into the mixture such that the amount of the Si-containing compound is set to be preferably greater than or equal to 0.1 parts by mass and less than or equal to 3.0 parts by mass, more preferably greater than or equal to 0.2 parts by mass and less than or equal to 2.5 parts by mass, and still more preferably greater than or equal to 0.3 parts by mass and less than or equal to 2.0 parts by mass with respect to 100 parts by mass which is the total mass of the Na-containing compound, the Ni-containing compound, and the M-containing compound.

Further, among the metal-containing compounds, a compound obtained according to the coprecipitation method can be used as the M-containing compound. In the description below, the M-containing compound which is an M-containing compound and is obtained according to the coprecipitation method will be referred to as an "M-containing coprecipitation method product" for convenience.

Specifically, first, a compound such as a chloride, a nitrate, an acetate, a formate, an oxalate, or a sulfate of Ti, Mn, Fe, and Co is dissolved in water to obtain a mixed aqueous solution. The concentration of all compounds is preferably greater than or equal to 0.1 mol/kg and less than or equal to 2 mol/kg and preferably greater than or equal to 0.4 mol/kg and less than or equal to 1.6 mol/kg with respect to the total mass of the mixed aqueous solution.

Next, a precipitate containing a target M-containing coprecipitation method product can be obtained by bringing the aqueous solution into contact with a precipitating agent.

Among compounds used as raw materials of the M-containing coprecipitation method product, a chloride or a sulfate is preferable. Further, in a case where compounds, which do not easily dissolve in water, such as an oxide, a hydroxide, and a metal material are used as the raw materials of the transition metal-containing compound, they may be dissolved in an acid such as hydrochloric acid, sulfuric acid, or nitric acid; or an aqueous solution of sulfuric acid or nitric acid to obtain an aqueous solution.

Examples of the precipitating agent used for preparation of the M-containing coprecipitation method product include one or more compounds selected from the group consisting of lithium hydroxide, sodium hydroxide, potassium hydroxide, lithium carbonate, sodium carbonate, potassium carbonate, ammonium carbonate, and urea. Each of these precipitating agents may be a hydrate or a combination of a compound and a hydrate.

Further, it is preferable for each of these precipitating agents to be dissolved in water and used as an aqueous solution (hereinafter, referred to as a "precipitating agent aqueous solution"). The concentration of the precipitating agent is greater than or equal to 0.5 mol/L and less than or equal to 10 mol/L and preferably greater than or equal to 1 mol/L and less than or equal to 8 mol/L with respect to the total volume of the precipitating agent aqueous solution. The precipitating agent is preferably potassium hydroxide or sodium hydroxide, and the precipitating agent aqueous solution is preferably a potassium hydroxide aqueous solution or a sodium hydroxide aqueous solution. Further, ammonia water can be exemplified as the precipitating agent aqueous solution. Ammonia water and the precipitating agent aqueous solution may be used in combination.

Examples of the method of bringing the mixed aqueous solution into contact with the precipitating agent include a method (1) of adding any one or both of the precipitating agent and the precipitating agent aqueous solution to the mixed aqueous solution, a method (2) of adding the mixed aqueous solution to the precipitating agent aqueous solution, and a method (3) of adding any one or both of the mixed aqueous solution, and the precipitating agent and the precipitating agent aqueous solution to water.

It is preferable for stirring to also be performed in a case where the methods (1) to (3) are carried out. Among the above-described methods, the method (2) of adding the mixed aqueous solution to the precipitating agent aqueous solution is preferable. According to this method, a high pH of the precipitating agent aqueous solution is easily maintained during the operation, and the particle diameter of the precipitate to be obtained is easily controlled. In the method (2), the pH of the precipitating agent aqueous solution tends to decrease as the mixed aqueous solution is added to the precipitating agent aqueous solution, but it is preferable to add the mixed aqueous solution to the precipitating agent aqueous solution while the pH of the precipitating agent aqueous solution is adjusted to 9 or greater and preferably 10 or greater. The pH thereof can be adjusted by performing addition to the precipitating agent aqueous solution.

In the coprecipitation method using the methods (1) to (3), it is preferable for the operation to be carried out in a nitrogen atmosphere or an argon atmosphere in order to suppress generation of impurities.

According to the methods (1) to (3), the precipitate containing an M-containing coprecipitation method product can be prepared.

A slurry containing a precipitate is obtained by mixing the mixed aqueous solution and the precipitating agent. A precipitate containing an M-containing coprecipitation method product is obtained by performing solid-liquid separation on the slurry to be obtained and recovering the precipitate. The solid-liquid separation may be performed using any method. From the viewpoint that the operation is easily carried out, it is preferable that the solid-liquid separation method is performed through filtration. Further, a method of volatilizing the liquid from the slurry such as heat drying, blast drying, vacuum drying, or spray drying may be used.

The recovered precipitate may be dried after being washed with a washing solution. An excess amount of the precipitating agent is attached to the precipitate obtained after the solid-liquid separation in some cases, but the attached precipitating agent can be reduced by washing the precipitate. As the washing solution used for washing the precipitate, water or a water-soluble organic solvent such as alcohol or acetone is preferable, and water is more preferable.

Examples of the method for drying the precipitate include heat drying, blast drying, vacuum drying, and a combination of these. The heat drying is performed preferably at a temperature higher than or equal to 50° C. and lower than or equal to 300° C. and more preferably at a temperature higher than or equal to 100° C. and lower than or equal to 200° C.

In a case where washing and drying of the precipitate using a washing solution are carried out in a combined manner and counted as once, the washing and drying may be carried out two or more times.

Examples of the mixing method in the mixing of the Na-containing compound, the Ni-containing compound, the M-containing compound, and the Si-containing compound or the mixing of the Na-containing compound, the Ni-containing compound, the M-containing coprecipitation method product, and the Si-containing compound include dry mixing and wet mixing. Among these, from the viewpoint that the operation is simple, dry mixing is preferable. Examples of the mixing device include a stirring and mixing device, a V type mixer, a W type mixer, a ribbon mixer, a drum mixer, and a ball mill.

In addition, the same mixing method as described above can be performed at the time of mixing the $M^1$-containing compound.

The composite metal oxide can be obtained by calcining the mixture obtained using the above-described method.

In the calcination step, the lower limit of the calcination temperature is preferably 800° C. or higher and more preferably 850° C. or higher. The upper limit of the calcination temperature is preferably 1000° C. or lower and more preferably 950° C. or lower. The upper limit and the lower limit of the calcination temperature can be optionally combined.

Among the combinations, in the present embodiment, a temperature higher than or equal to 800° C. and lower than or equal to 1000° C. is preferable and a temperature higher than or equal to 850° C. and lower than or equal to 950° C. is more preferable.

The calcination step is performed by holding the above-described temperature for preferably longer than or equal to 4 hours and shorter than or equal to 20 hours and more preferably longer than or equal to 6 hours and shorter than or equal to 15 hours.

In the present specification, the calcination temperature in the calcination step indicates the preset temperature of the calcination device.

The temperature increase rate up to the calcination temperature from the start of temperature increase in the calcination step is greater than or equal to 50° C./hour and less than or equal to 400° C./hour. Further, the temperature decrease rate from the calcination temperature to room temperature is preferably greater than or equal to 10° C./hour and less than or equal to 400° C./hour.

Examples of the atmosphere during calcination include an air atmosphere, an oxygen atmosphere, a nitrogen atmosphere, an argon atmosphere, and a mixed gas atmosphere of these. The air atmosphere is preferable because it can be easily controlled, and the oxygen atmosphere, the nitrogen atmosphere, the argon atmosphere, or the mixed gas atmosphere is preferable in view of stability of the sample after calcination.

Further, the crystallinity of the composite metal oxide to be generated and the average particle diameter of particles constituting the composite metal oxide can be controlled by using a suitable amount of a halide such as a fluoride or a chloride, an oxide having a melting point of 800° C. or lower, and a carbonate as the metal-containing compound.

Further, a product (composite metal oxide) to be obtained by the calcination may be ground, washed, or classified optionally using a device which has been typically used industrially such as a ball mill, a jet mill, or a vibration mill.

With the above-described configuration, the composite metal oxide produced according to the present embodiment has a high crystallinity. In this manner, the composite metal oxide is unlikely to react with the moisture in air so that degradation of the discharge capacity caused by elution of sodium can be suppressed. Further, since generation of sodium hydroxide which may react with the moisture in air and cause gelation can be suppressed, gelation is unlikely to occur, and the coatability of an electrode paste at the time of application can be improved.

<Electrode and Sodium Secondary Battery>

The electrode according to the present embodiment and the sodium secondary battery containing the electrode contain the composite metal oxide produced in the present invention as an electrode active material. The content of the positive electrode active material is preferably in a range of 80% to 97% by mass and more preferably in a range of 85% to 97% by mass with respect to the total mass of the positive electrode for a sodium secondary battery. The positive electrode for a sodium secondary battery can be produced by allowing a positive electrode mixture containing a positive electrode active material, a conductive material, and a binder to be supported by a positive electrode current collector.

The content of the conductive material is preferably in a range of 0.1% to 12% by mass and more preferably in a range of 0.2% to 10% by mass with respect to the total mass of the positive electrode active material.

The content of the binder is preferably in a range of 0.5% to 12% by mass and more preferably in a range of 1% to 8% by mass with respect to the total mass of the positive electrode active material.

Examples of the conductive material include carbon materials such as natural graphite, artificial graphite, cokes, and carbon black.

A thermoplastic resin may be exemplified as the binder. Specific examples of the thermoplastic resin include a fluorine resin such as polyvinylidene fluoride (hereinafter, also referred to as PVDF), polytetrafluoroethylene (hereinafter, also referred to as PTFE), an ethylene tetrafluoride-propylene hexafluoride-vinylidene fluoride-based copolymer, a propylene hexafluoride-vinylidene-fluoride-based copolymer, or an ethylene tetrafluoride-perfluorovinyl ether-based copolymer; and a polyolefin resin such as polyethylene or polypropylene. As the resin, two or more of these may be used.

Examples of the positive electrode current collector include aluminum metals, nickel metals, and stainless steel. An aluminum metal is preferable because it can be easily processed into a thin film and has a low cost. Examples of the shape of the positive electrode current collector include a foil shape, a flat plate shape, a mesh shape, a net shape, a lath shape, and a punching shape, and a combination of these (for example, a mesh-like flat plate). The surface of the positive electrode current collector may be formed to be uneven through an etching treatment or embossing processing.

Examples of the method of allowing the positive electrode mixture to be supported by the positive electrode current collector include a method of fixing the positive electrode mixture to the current collector by performing pressure molding.

In addition, the method of fixing the positive electrode mixture to the positive electrode current collector can be employed by further adding an organic solvent to the positive electrode mixture to obtain a positive electrode mixture paste, coating the positive electrode current collector with this positive electrode mixture paste, and drying the current collector. According to this method, the positive electrode mixture may be firmly fixed to the positive electrode current collector by pressing a sheet obtained by fixing the positive electrode mixture to the positive electrode current collector.

Examples of the organic solvent used in the positive electrode mixture paste include an amine-based solvent such as N,N-dimethylaminopropylamine or diethylenetriamine; an ether-based solvent such as tetrahydrofuran; a ketone-based solvent such as methyl ethyl ketone; an ester-based solvent such as methyl acetate; and an amide-based solvent such as dimethylacetamide or N-methyl-2-pyrrolidone (hereinafter, also referred to as NMP).

The kneading method at the time of preparation of the positive electrode mixture paste is not particularly limited, and a mixer having a high shearing force is preferable as the mixer used for kneading. Specific examples thereof include a planetary mixer, a kneader, an extrusion type kneader, and a thin-film revolving high speed stirrer.

As the mixing order, the positive electrode active material, the conductive material, the binder, and the solvent may be mixed at once, or the binder, the positive electrode active material, and the conductive material may be sequentially mixed into the solvent. This order is not particularly limited, and the mixture of the positive electrode active material and the conductive material may be gradually added thereto. Further, the binder may be mixed with the solvent in advance to be dissolved therein.

Examples of the method of coating the positive electrode current collector with the positive electrode mixture paste include a slit die coating method, a screen coating method, a curtain coating method, a knife coating method, a gravure coating method, and an electrostatic spray method.

The positive electrode according to the present embodiment can be produced as described above.

Since the positive electrode for a sodium secondary battery with the above-described configuration has the above-described positive electrode active material for a sodium secondary battery according to the present embodiment, a sodium secondary battery with high energy density can be provided in a case where the positive electrode is used for preparation of a sodium secondary battery.

The sodium secondary battery according to the present embodiment includes the above-described positive electrode according to the present embodiment, a negative electrode, and a nonaqueous electrolyte.

(Negative Electrode)

The negative electrode can be doped with sodium ions or dedoped at a lower potential than the positive electrode. Examples of the negative electrode include an electrode in which a negative electrode mixture containing a negative electrode material is supported by a negative electrode current collector and an electrode formed of only a negative electrode material. Examples of the negative electrode material include materials which can be doped with sodium ions or dedoped at a lower potential than the positive electrode, among carbon materials, chalcogen compounds (such as oxides and sulfides), nitrides, metals, and alloys. These negative electrode materials may be mixed.

Specific examples of the negative electrode material are as follows. Specific examples of the carbon material include materials which can be doped with sodium ions or dedoped at a lower potential than the positive electrode, among graphite such as natural graphite or artificial graphite, cokes, carbon black, pyrolytic carbon, carbon fibers, and polymer calcined materials. These carbon materials, oxides, sulfides, and nitrides may be used in combination and may be crystalline or amorphous. These carbon materials, oxides, sulfides, and nitrides are used as negative electrodes by mainly being supported by a negative electrode current collector. Specific examples of the metals include sodium metals, silicon metals, and tin metals. Examples of the alloys include a sodium alloy such as a sodium-aluminum alloy, a sodium-nickel alloy, or a sodium-silicon alloy; a silicon alloy such as a silicon-zinc alloy; a tin alloy such as a tin-manganese alloy, a tin-cobalt alloy, a tin-nickel alloy, a tin-copper alloy, a tin-lanthanum alloy, or a tin-nickel-lanthanum alloy; and an alloy such as a copper-antimony alloy. These metals and alloys are mainly used alone as an electrode (for example, a foil-like electrode). Examples of the oxides include an oxide such as lithium titanium oxide.

The negative electrode mixture may contain a binder as necessary. A thermoplastic resin may be exemplified as the binder. Specific examples of the thermoplastic resin include PVDF, thermoplastic polyimide, carboxymethyl cellulose, polyethylene, and polypropylene. In a case where an electrolytic solution does not contain ethylene carbonate described below and the negative electrode mixture contains polyethylene carbonate, cycle characteristics of a battery to be obtained and large current discharge characteristics are improved in some cases.

Examples of the negative electrode current collector include copper metals, nickel metals, stainless steel, and aluminum metals. Copper metals or aluminum metals are preferable because they do not easily form an alloy with sodium and are easily processed into a thin film. Examples of the method of allowing the negative electrode mixture to be supported by the negative electrode current collector include, similar to the positive electrode, a method of performing press molding; and a method of fixing the negative electrode mixture to the negative electrode current collector by further using an organic solvent or the like to obtain a negative electrode mixture paste, coating the negative electrode current collector with the paste, drying the current collector to obtain a sheet, and pressing the obtained sheet.

(Nonaqueous Electrolyte)

Examples of the nonaqueous electrolyte which can be used for the sodium secondary battery according to the present embodiment include sodium perchlorate ($NaClO_4$), sodium hexafluorophosphate ($NaPF_6$), sodium hexafluoroarsenate ($NaAsF_6$), sodium hexafluoroantimonate ($NaSbF_6$), sodium tetrafluoroborate ($NaBF_4$), sodium trifluoromethanesulfonate ($NaCF_3SO_3$), sodium bis(trifluoromethanesulfonyl)imide ($NaN(SO_2CF_3)_2$), a lower aliphatic carboxylic acid sodium salt, and sodium tetrachloroaluminate ($NaAlCl_4$). As the nonaqueous electrolyte, a mixture of two or more of these may be used. It is preferable that the electrolyte contains at least one fluorine-containing sodium salt selected from the group consisting of sodium hexafluorophosphate, sodium hexafluoroarsenate, sodium hexafluoroantimonate, sodium tetrafluoroborate, sodium trifluoromethanesulfonate, and sodium bis (trifluoromethanesulfonyl)imide.

Further, the nonaqueous electrolyte can be used as a nonaqueous electrolytic solution after being dissolved in an organic solvent.

The content of the nonaqueous electrolyte is preferably in a range of 0.3 to 2.5 mol % and more preferably in a range of 0.5 to 2 mol % with respect to the total mass of the nonaqueous electrolytic solution.

Examples of the organic solvent in the nonaqueous electrolytic solution include carbonates such as propylene carbonate, ethylene carbonate, dimethyl carbonate, diethyl carbonate, ethyl methyl carbonate, isopropyl methyl carbonate, vinylene carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; a sulfur-containing compound such as sulfolane, dimethyl sulfoxide, or 1,3-propane sultone; and an organic solvent which contains a fluorine substituent, in which a fluorine substituent is further introduced into the organic solvent.

It is preferable for a part of the organic solvent in the nonaqueous electrolytic solution to contain an organic solvent containing a fluorine substituent.

Examples of the organic solvent containing a fluorine substituent include 4-fluoro-1,3-dioxolan-2-one (hereinafter, also referred to as FEC or fluoroethylene carbonate) and trans- or cis-4,5-difluoro-1,3-dioxolan-2-one (hereinafter, also referred to as DFEC or difluoroethylene carbonate).

As the organic solvent containing a fluorine substituent, 4-fluoro-1,3-dioxolan-2-one is preferable.

The organic solvent containing any of these fluorine substituents may be used alone, but it is preferable to use a mixed solvent obtained by combining an organic solvent that does not contain a fluorine substituent with this organic solvent. In a case where a part of the organic solvent in the nonaqueous electrolytic solution contains an organic solvent containing a fluorine substituent, the proportion of the organic solvent containing a fluorine substituent is greater than or equal to 0.01% by volume and less than or equal to 10% by volume, preferably greater than or equal to 0.1% by volume and less than or equal to 8% by volume, and more preferably greater than or equal to 0.5% by volume and less than or equal to 5% by volume with respect to the total volume of the nonaqueous electrolytic solution.

The nonaqueous electrolyte can be used in a state in which the nonaqueous electrolytic solution is held by a polymer compound, in other words, the nonaqueous electrolyte can be used as a gel-like electrolyte.

Further, a solid electrolyte can be used as the nonaqueous electrolyte which can be used in the sodium secondary battery according to the present embodiment.

As the solid electrolyte, for example, a polyethylene oxide-based polymer compound or a polymer electrolyte of a polymer compound containing at least one or more of a polyorganosiloxane chain and a polyoxyalkylene chain can be used. Further, safety can be further increased by using, as the solid electrolyte, a sulfide electrolyte such as sodium sulfide-silicon sulfide ($Na_2S$—$SiS_2$), sodium sulfide-germanium sulfide ($Na_2S$—$GeS_2$), sodium sulfide-phosphorus sulfide ($Na_2S$—$P_2S_5$), or sodium sulfide-boron sulfide ($Na_2S$—$B_2S_3$); an inorganic compound electrolyte containing a sulfide such as sodium sulfide-silicon sulfide-sodium phosphate ($Na_2S$—$SiS_2$—$Na_3PO_4$) or $Na_2S$—$SiS_2$—$Na_2SO_4$; or a NASICON type electrolyte such as sodium zirconium phosphate ($NaZr_2(PO_4)_3$).

Further, in a case where a solid electrolyte is used in the sodium secondary battery according to the present embodiment, the solid electrolyte plays a role of a separator described below in some cases. In this case, a separator may not be required.

(Separator)

The sodium secondary battery according to the present embodiment may include a separator disposed between the positive electrode and the negative electrode. Examples of the form of the separator include a porous film, a nonwoven fabric, and a woven fabric.

Examples of the material that forms the separator include materials such as a polyolefin resin, for example, polyethylene or polypropylene, a fluorine resin, and a nitrogen-containing aromatic polymer. Further, a single-layer separator or laminated separator obtained by using two or more of these materials may be used.

As the separator, the separators described in Japanese Unexamined Patent Application, First Publication No. 2000-30686 and Japanese Unexamined Patent Application, First Publication No. H10-324758 can be exemplified.

From the viewpoints of increasing the volume energy density of the battery and reducing the internal resistance, it is preferable for the thickness of the separator to be as small as possible within the range where the mechanical strength is maintained. Typically, the thickness of the separator is preferably greater than or equal to 5 μm and less than or equal to 200 μm and more preferably greater than or equal to 5 μm and less than or equal to 40 μm.

It is preferable for the separator to have a porous film containing a thermoplastic resin. In a case where an abnormal current flows in the battery due to a short circuit or the like between the positive electrode and the negative electrode in the sodium secondary battery, it is preferable to cut off the current and to prevent (shut down) an excessive current from flowing.

In a case where the separator has a porous film containing a thermoplastic resin, the shutdown is performed by the porous film in the separator being softened or melted to block fine holes in a case where the separator in a short circuit point is overheated due to the short circuit and the temperature of the separator exceeds the pre-estimated (typical) working temperature. Further, even in a case where the temperature in the battery is increased to a high temperature of a certain level after the shutdown, it is preferable for the film of the separator not to be damaged due to the temperature and for the heat resistance thereof to be high enough to maintain the state after the shutdown.

The damage to the film due to heat can be prevented by using a separator formed of a laminated porous film in which a heat resistant porous layer containing a heat resistant resin and a porous film containing a thermoplastic resin are laminated, as the separator. Here, the heat resistant porous layer may be laminated on both surfaces of the porous film.

(Method of Producing Sodium Secondary Battery)

Figure 1B:
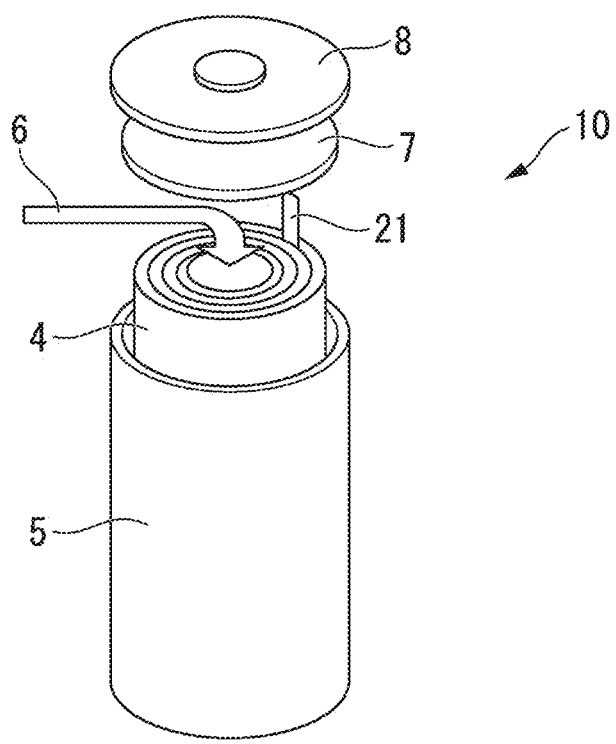
FIG. 1B is a schematic configuration view showing an example of a sodium secondary battery.

FIG. 1A and FIG. 1B are schematic views showing an example of the sodium secondary battery according to the present embodiment. A cylindrical sodium secondary battery 10 according to the present embodiment is produced in the following manner.

First, as illustrated in FIG. 1A, a pair of strip-like separators 1, a strip-like positive electrode 2 having a lead 21 at one end, and a strip-like negative electrode 3 having a lead 31 at one end are laminated and wound in order of the separator 1, the positive electrode 2, the separator 1, and the negative electrode 3 to obtain an electrode group 4.

Next, as illustrated in FIG. 1B, the electrode group 4 and an insulator (not illustrated) are stored in a battery can 5, the bottom of the can is sealed, the electrode group 4 is impregnated with an electrolytic solution 6, and an electrolyte is disposed between the positive electrode 2 and the negative electrode 3. Further, the sodium secondary battery 10 can be produced by sealing the upper portion of the battery can 5 with a top insulator 7 and a sealing member 8.

As the shape of the electrode group 4, a columnar shape in which the cross-sectional shape obtained by cutting the electrode group 4 in a direction perpendicular to a winding shaft is a circle, an ellipse, a rectangle, or a rectangle with rounded corners can be exemplified.

Further, as the shape of the sodium secondary battery having such an electrode group 4, a shape defined in IEC60086 which is a standard for batteries defined by International Electrotechnical Commission (IEC) or JIS C 8500 can be employed. Examples thereof include shapes such as a cylindrical shape and a square shape.

Further, the configuration of the sodium secondary battery is not limited to the above-described winding type configuration, and the sodium secondary battery may have a laminate type configuration formed by repeatedly stacking a structure in which the positive electrode, the separator, the negative electrode, and the separator are laminated. Examples of the laminate type sodium secondary battery include so-called coin type batteries, button type batteries, and paper type (or sheet type) batteries.

Since the sodium secondary battery having such a configuration includes the positive electrode for a sodium secondary battery according to the present embodiment, the energy density increases.

Hereinbefore, preferred embodiments of the present invention have been described with reference to the accompanying drawings, but the present invention is not limited to the examples. The shapes, the combinations, and the like of each constituent member in the above-described examples are merely examples, and various changes can be made based on the design requirements within the range not departing from the scope of the present invention.

EXAMPLES

Hereinafter, the present invention will be described based on examples and comparative examples.

[Measurement and Evaluation Method]

(1) Powder X-Ray Diffraction Measurement

The powder X-ray diffraction measurement was performed under the following conditions using a powder X-ray diffraction measuring device X'pertPRO MPD (manufactured by PANalytical Inc.)

X-ray: CuKα

Voltage-current: 45 kV-40 mA

Measurement angle range: 2θ=10° to 90°

Step: 0.02°

Scan speed: 4°/min

The peak intensity of a (200) plane of a by-product NiO which was observed in the vicinity of 43° of a powder X-ray diffraction spectrum obtained by the powder X-ray diffraction measurement was set as I, and the peak intensity of a (104) plane of a composite metal oxide $Na_aM^1_rM_bNi_eSi_cO_d$ (M represents one or more elements selected from the group consisting of B, Ti, Mn, Fe, and Co, $M^1$ represents one or more elements selected from the group consisting of Mg, Ca, and Sr, and relations 0≤r≤0.1, 0.5≤a≤1.0, 0<c<0.1, 0.5<b+c≤1.1, 0<e≤0.5, and 1.95<d<2.05 are satisfied) which was observed in the vicinity of 41° to 42.5° was set as $I_0$, the value of $I/I_0$ obtained by dividing I by $I_0$ was determined.

(2) pH Measurement

The pH was acquired by adding 20 mL of pure water to 1 g of electrode active material powder, stirring the solution at room temperature for 5 minutes, and performing measurement on the solution that has stood for 30 seconds using a pH meter D-52 (manufactured by HORIBA, Ltd.).

(3) Evaluation of Coatability

The electrode active materials of Examples 1 to 10 and Comparative Examples 1 to 4, acetylene black (HS 100, manufactured by Denka Co., Ltd.) as a conductive material, PVDF (TA5130, manufactured by Solvay S. A.) as a binder, and NMP (Lithium Battery Grade, manufactured by Kishida Chemical Co., Ltd.) as an organic solvent were used. PVDF was weighed such that the mass ratio (PVDF:NMP) was set to 6:94, stirred, and dissolved to obtain a binder solution. The electrode active material, the conductive agent, the binder, and NMP were weighed such that the mass ratio (electrode active material:conductive agent:binder:NMP) was set to 90:5:5:100, and the solution was stirred and mixed with the binder solution using T. K. FILMIX Model 30-25 (manufactured by PRIMIX Corporation), thereby obtaining an electrode mixture paste. A rotation wheel was set to rotate under conditions of 5000 rpm for 3 minutes. In Table 2, a case where the electrode mixture paste was not able to be applied because the paste was gelled or cured was evaluated as "x" and a case where the paste was able to be applied without any problems was evaluated as "○".

(4) High Frequency Inductively Coupled Plasma Emission Spectrometry (ICP-AES)

Approximately 500 mg of the electrode active material was weighed using a beaker, 10 mL of (1+1) hydrochloric acid was added thereto, 0.1 mL of hydrogen peroxide was added three times, and the solution was allowed to stand. 10 mL of (1+1) hydrochloric acid was further added thereto, and the beaker was covered with watch glass and heated on a hot plate for dissolution. The solution in which the sample was dissolved was filtered using a 0.2 μm membrane filter (Omnipore™ membrane, PTFE). The constant volume of the filtrate was set to 100 mL, and the ratio between the elements in the solution was measured according to the calibration curve method using an ICP-AES device SPS3000 (manufactured by Seiko Instruments Inc.). The amount of the elements in the solution was set as the amount of elements dissolved in solid, and the compositional formula was calculated by assuming that b+c was 1 and d was 2 in $Na_aM^1_bM_bNi_eSi_cO_d$ (M represents one or more elements selected from the group consisting of B, Ti, Mn, Fe, and Co, and $M^1$ represents one or more elements selected from the group consisting of Mg, Ca, and Sr).

Example 1

Figure 2:
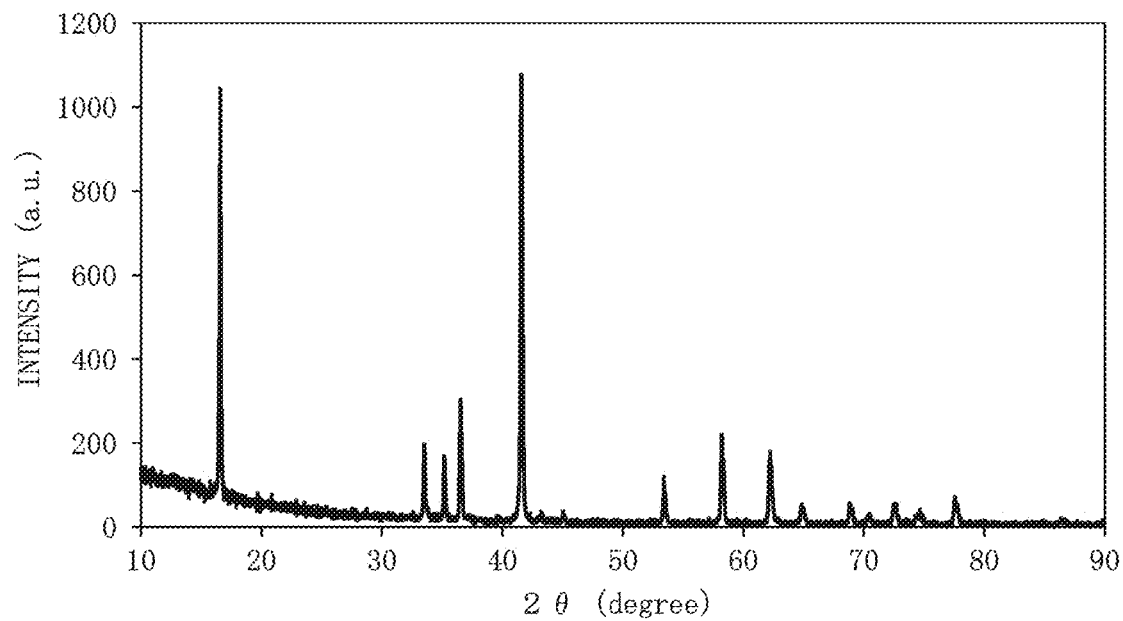
FIG. 2 is an XRD chart for an electrode active material of Example 1.

An agate mortar was charged with 143.1 mg of silica ($SiO_2$), sodium carbonate ($Na_2CO_3$), calcium hydroxide ($Ca(OH)_2$), manganese (IV) oxide ($MnO_2$), iron (II, III) oxide ($Fe_3O_4$), and nickel (II) oxide (NiO) were used as a metal-containing compound, 15.3 g of the compound in total was weighed such that the molar ratio of Na:Ca:Mn:Fe:Ni was set to 0.99:0.02:0.31:0.41:0.28, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 1. The electrode active material 1 was dissolved in hydrochloric acid, and the composition was analyzed based on ICP emission analysis. As the result, the molar ratio between the dissolved components (Na:Ca:Mn:Fe:Ni:Si) was 0.98:0.02:0.30:0.41:0.28:0.01 ($Na_{0.98}Ca_{0.02}Mn_{0.30}Fe_{0.41}Ni_{0.28}Si_{0.01}O_2$). As determined by powder X-ray diffraction measurement performed on the electrode active material 1, the crystal structure of the electrode active material 1 belongs to a layered structure (FIG. 2). The peak intensity of the (200) plane of the by-product NiO was set as I, and the peak intensity of the composite metal oxide represented by Formula (1) was set as $I_0$, the value of $I/I_0$ obtained by dividing I by $I_0$ was 0.033. As determined by pH measurement performed on the electrode active material 1, the pH thereof was 12.5.

The mass of the silicon-containing compound in a case where the total mass of the sodium-containing compound, the nickel-containing compound, and the M-containing compound was set to 100 parts by mass is listed in Table 1.

Example 2

Figure 3:
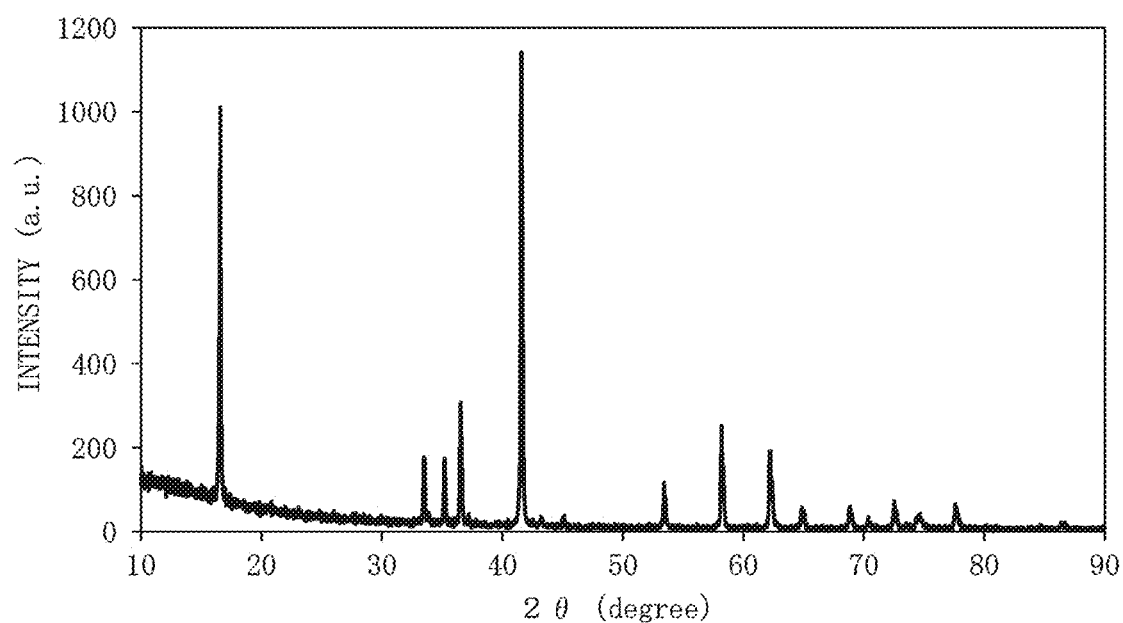
FIG. 3 is an XRD chart for an electrode active material of Example 2.

An agate mortar was charged with 214.7 mg of silica ($SiO_2$), sodium carbonate ($Na_2CO_3$), calcium hydroxide ($Ca(OH)_2$), manganese (IV) oxide ($MnO_2$), iron (II, III) oxide ($Fe_3O_4$), and nickel (II) oxide (NiO) were used as a metal-containing compound, 15.3 g of the compound in total was weighed such that the molar ratio of Na:Ca:Mn:Fe:Ni was set to 0.99:0.02:0.31:0.41:0.28, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 2. The electrode active material 2 was dissolved in hydrochloric acid, and the composition was analyzed based on ICP emission analysis. As the result, the molar ratio between the dissolved components (Na:Ca:Mn:Fe:Ni:Si) was 0.97:0.02:0.30:0.40:0.27:0.02 ($Na_{0.97}Ca_{0.02}Mn_{0.30}Fe_{0.40}Ni_{0.27}Si_{0.02}O_2$). As determined by powder X-ray diffraction measurement performed on the electrode active material 2, the crystal structure of the electrode active material 2 belongs to a layered structure (FIG. 3). The peak intensity of the (200) plane of the by-product NiO was set as I, and the peak intensity of the composite metal oxide represented by Formula (1) was set as $I_0$, the value of $I/I_0$ obtained by dividing I by $I_0$ was 0.032. As determined by pH measurement performed on the electrode active material 2, the pH thereof was 12.4.

The mass of the silicon-containing compound in a case where the total mass of the sodium-containing compound, the nickel-containing compound, and the M-containing compound was set to 100 parts by mass is listed in Table 1.

Example 3

Figure 4:
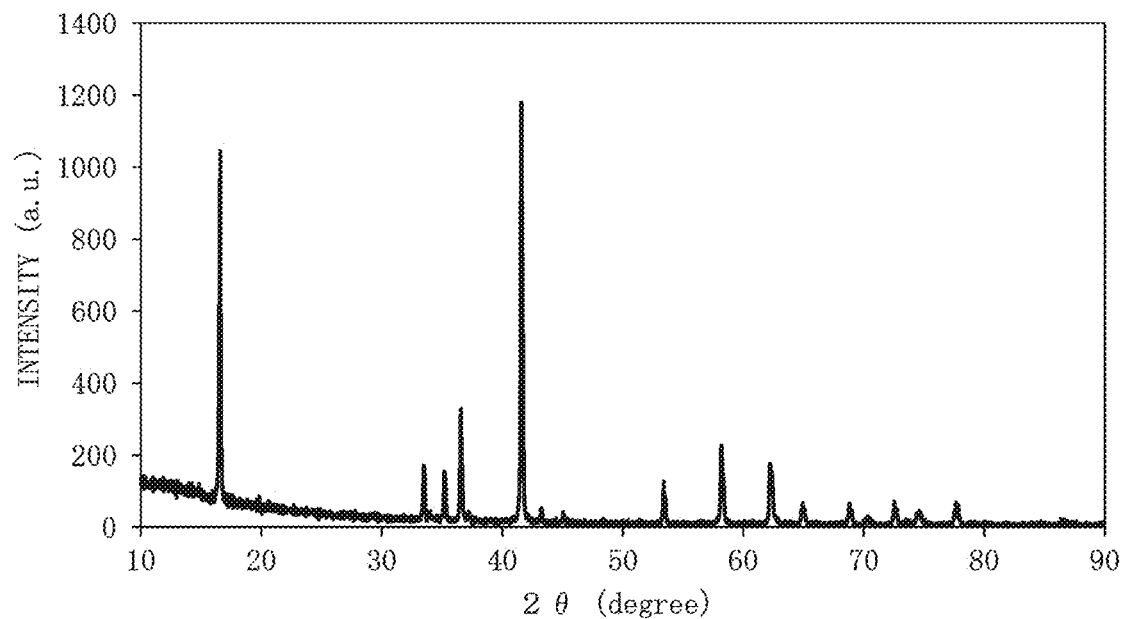
FIG. 4 is an XRD chart for an electrode active material of Example 3.

An agate mortar was charged with 286.6 mg of silica ($SiO_2$), sodium carbonate ($Na_2CO_3$), calcium hydroxide ($Ca(OH)_2$), manganese (IV) oxide ($MnO_2$), iron (II, III) oxide ($Fe_3O_4$), and nickel (II) oxide (NiO) were used as a metal-containing compound, 15.3 g of the compound in total was weighed such that the molar ratio of Na:Ca:Mn:Fe:Ni was set to 0.99:0.02:0.31:0.41:0.28, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 3. The electrode active material 3 was dissolved in hydrochloric acid, and the composition was analyzed based on ICP emission analysis. As the result, the molar ratio between the dissolved components (Na:Ca:Mn:Fe:Ni:Si) was 0.98:0.02:0.30:0.41:0.28:0.02 ($Na_{0.98}Ca_{0.02}Mn_{0.30}Fe_{0.41}Ni_{0.28}Si_{0.01}O_2$). As determined by powder X-ray diffraction measurement performed on the electrode active material 3, the crystal structure of the electrode active material 3 belongs to a layered structure (FIG. 4). The peak intensity of the (200) plane of the by-product NiO was set as I, and the peak intensity of the composite metal oxide represented by Formula (1) was set as $I_0$, the value of $I/I_0$ obtained by dividing I by $I_0$ was 0.045. As determined by pH measurement performed on the electrode active material 3, the pH thereof was 12.3.

The mass of the silicon-containing compound in a case where the total mass of the sodium-containing compound, the nickel-containing compound, and the M-containing compound was set to 100 parts by mass is listed in Table 1.

Example 4

Figure 5:
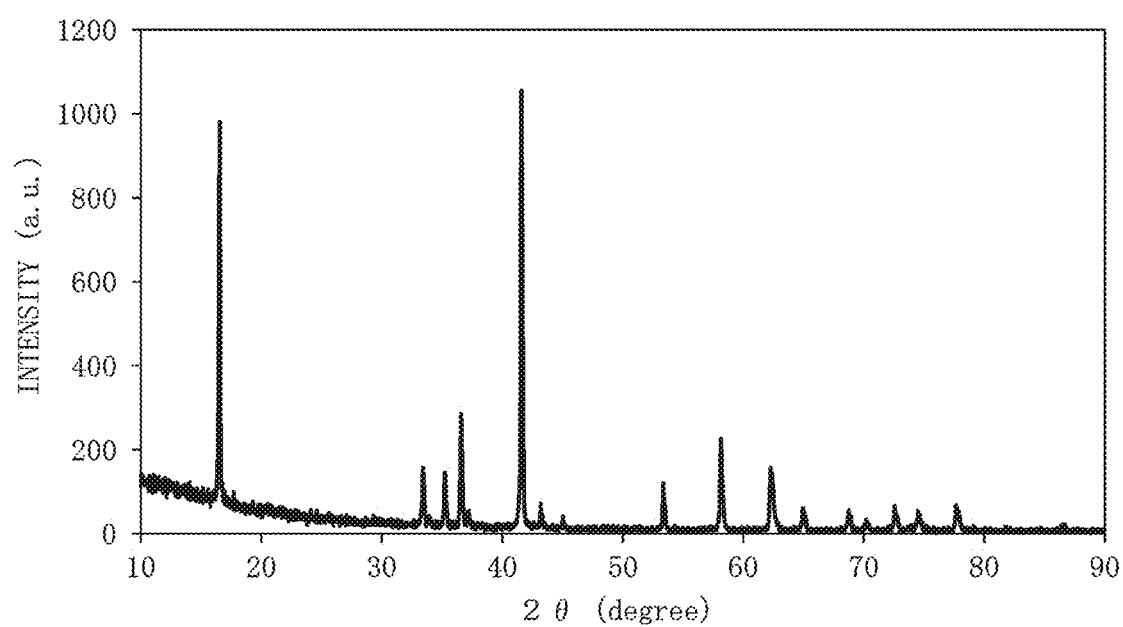
FIG. 5 is an XRD chart for an electrode active material of Example 4.

An agate mortar was charged with 357.8 mg of silica ($SiO_2$), sodium carbonate ($Na_2CO_3$), calcium hydroxide ($Ca(OH)_2$), manganese (IV) oxide ($MnO_2$), iron (II, III) oxide ($Fe_3O_4$), and nickel (II) oxide (NiO) were used as a metal-containing compound, 15.3 g of the compound in total was weighed such that the molar ratio of Na:Ca:Mn:Fe:Ni was set to 0.99:0.02:0.31:0.41:0.28, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 4. The electrode active material 4 was dissolved in hydrochloric acid, and the composition was analyzed based on ICP emission analysis. As the result, the molar ratio between the dissolved components (Na:Ca:Mn:Fe:Ni:Si) was 0.97:0.02:0.30:0.41:0.27:0.02 ($Na_{0.97}Ca_{0.02}Mn_{0.30}Fe_{0.41}Ni_{0.27}Si_{0.02}O_2$). As determined by powder X-ray diffraction measurement performed on the electrode active material 4, the crystal structure of the electrode active material 4 belongs to a layered structure (FIG. 5). The peak intensity of the (200) plane of the by-product NiO was set as I, and the peak intensity of the composite metal oxide represented by Formula (1) was set as $I_0$, the value of $I/I_0$ obtained by dividing I by $I_0$ was 0.068. As determined by pH measurement performed on the electrode active material 4, the pH thereof was 12.5.

The mass of the silicon-containing compound in a case where the total mass of the sodium-containing compound, the nickel-containing compound, and the M-containing compound was set to 100 parts by mass is listed in Table 1.

Example 5

Figure 6:
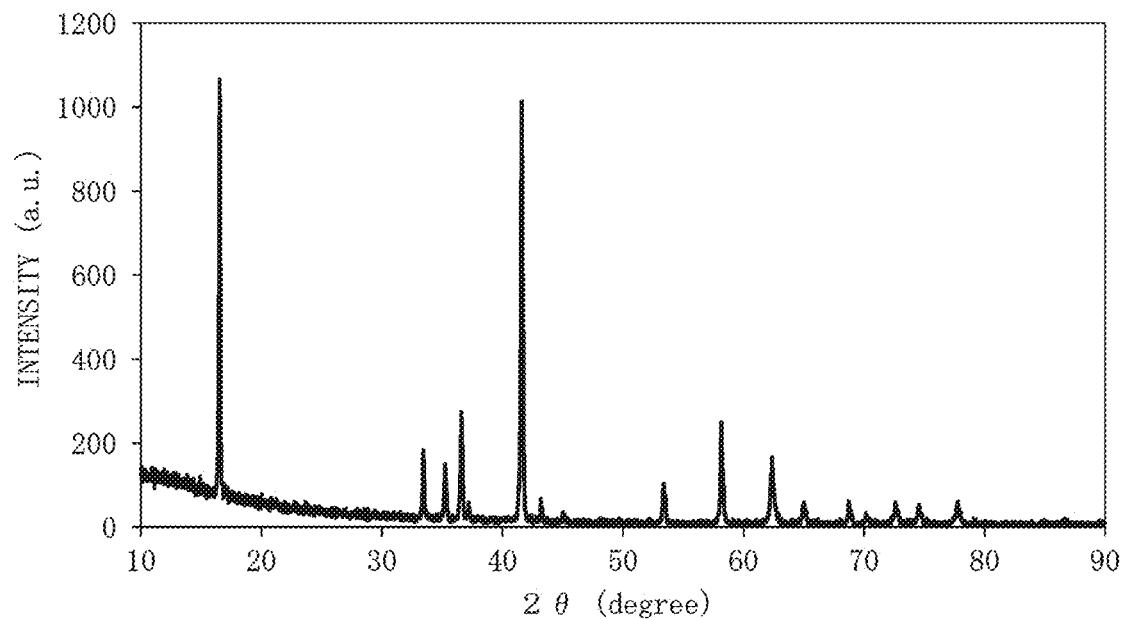
FIG. 6 is an XRD chart for an electrode active material of Example 5.

An agate mortar was charged with 286.1 mg of silica ($SiO_2$), sodium carbonate ($Na_2CO_3$), manganese (IV) oxide ($MnO_2$), iron (II, III) oxide ($Fe_3O_4$), and nickel (II) oxide (NiO) were used as a metal-containing compound, 15.3 g of the compound in total was weighed such that the molar ratio of Na:Mn:Fe:Ni was set to 0.99:0.31:0.41:0.28, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 5. The electrode active material 5 was dissolved in hydrochloric acid, and the composition was analyzed based on ICP emission analysis. As the result, the molar ratio between the dissolved components (Na:Mn:Fe:Ni:Si) was 0.98:0.30:0.42:0.27:0.01 ($Na_{0.98}Mn_{0.30}Fe_{0.42}Ni_{0.27}Si_{0.01}O_2$). As determined by powder X-ray diffraction measurement performed on the electrode active material 5, the crystal structure of the electrode active material 5 belongs to a layered structure (FIG. 6). The peak intensity of the (200) plane of the by-product NiO was set as I, and the peak intensity of the composite metal oxide represented by Formula (1) was set as $I_0$, the value of $I/I_0$ obtained by dividing I by $I_0$ was 0.053. As determined by pH measurement performed on the electrode active material 5, the pH thereof was 12.4.

The mass of the silicon-containing compound in a case where the total mass of the sodium-containing compound, the nickel-containing compound, and the M-containing compound was set to 100 parts by mass is listed in Table 1.

Comparative Example 1

Sodium carbonate ($Na_2CO_3$), manganese (IV) oxide ($MnO_2$), iron (III) oxide ($Fe_2O_3$), and nickel (II) oxide (NiO) were used as a metal-containing compound, 15.3 g of the compound in total was weighed such that the molar ratio of Na:Mn:Fe:Ni was set to 0.99:0.31:0.41:0.28, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 6 ($Na_{0.99}Mn_{0.31}Fe_{0.41}Ni_{0.28}O_2$).

As determined by pH measurement performed on the electrode active material 6, the pH thereof was 12.9.

Comparative Example 2

Sodium carbonate ($Na_2CO_3$), calcium hydroxide ($Ca(OH)_2$), manganese (IV) oxide ($MnO_2$), iron (II, III) oxide ($Fe_3O_4$), and nickel (II) oxide (NiO) were used as a metal-containing compound, 15.3 g of the compound in total was weighed such that the molar ratio of Na:Ca:Mn:Fe:Ni was set to 0.99:0.02:0.31:0.41:0.28, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 7 ($Na_{0.99}Ca_{0.02}Mn_{0.31}Fe_{0.41}Ni_{0.28}O_2$). As determined by pH measurement performed on the electrode active material 7, the pH thereof was 13.0.

Comparative Example 3

Figure 7:
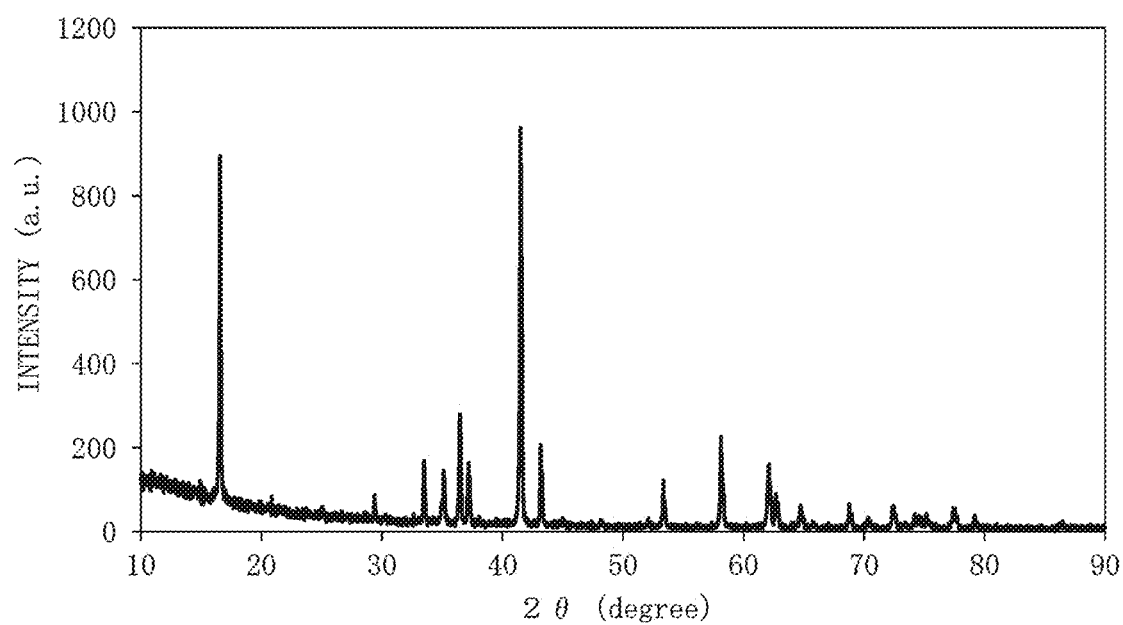
FIG. 7 is an XRD chart for an electrode active material of Comparative Example 3.

An agate mortar was charged with 728.8 mg of silica ($SiO_2$), sodium carbonate ($Na_2CO_3$), manganese (IV) oxide ($MnO_2$), iron (III) oxide ($Fe_2O_3$), and nickel (II) oxide (NiO) were used as a metal-containing compound, 15.3 g of the compound in total was weighed such that the molar ratio of Na:Mn:Fe:Ni was set to 1.07:0.31:0.41:0.28, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 8. The electrode active material 8 was dissolved in hydrochloric acid, and the composition was analyzed based on ICP emission analysis. As the result, the molar ratio between the dissolved components (Na:Mn:Fe:Ni:Si) was 1.04:0.30: 0.42:0.27:0.01 ($Na_{1.04}Mn_{0.30}Fe_{0.42}Ni_{0.27}Si_{0.01}O_2$). As determined by powder X-ray diffraction measurement performed on the electrode active material 8, the crystal structure of the electrode active material 8 belongs to a layered structure (FIG. 7). The peak intensity of the (200) plane of the by-product NiO was set as I, and the peak intensity of the composite metal oxide represented by Formula (1) was set as $I_0$, the value of $I/I_0$ obtained by dividing I by $I_0$ was 0.215. As determined by pH measurement performed on the electrode active material 8, the pH thereof was 12.8.

The mass of the silicon-containing compound in a case where the total mass of the sodium-containing compound, the nickel-containing compound, and the M-containing compound was set to 100 parts by mass is listed in Table 1.

Comparative Example 4

An agate mortar was charged with 77.8 mg of titania ($TiO_2$), 26.4 mg of zinc oxide (ZnO), and 32.0 mg of alumina ($Al_2O_3$), sodium carbonate ($Na_2CO_3$), calcium hydroxide ($Ca(OH)_2$), manganese (IV) oxide ($MnO_2$), iron (III) oxide ($Fe_2O_3$), and nickel (II) oxide (NiO) were used as a metal-containing compound, 15.4 g of the compound in total was weighed such that the molar ratio of Na:Mn:Fe:Ni was set to 0.99:0.03:0.31:0.41:0.28, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 9 ($Na_{0.98}Ca_{0.03}Mn_{0.30}Fe_{0.41}Ni_{0.27}Ti_{0.01}Zn_{0.003}Al_{0.002}O_2$). As determined by pH measurement performed on the electrode active material 9, the pH thereof was 12.7.

Example 6

Figure 9:
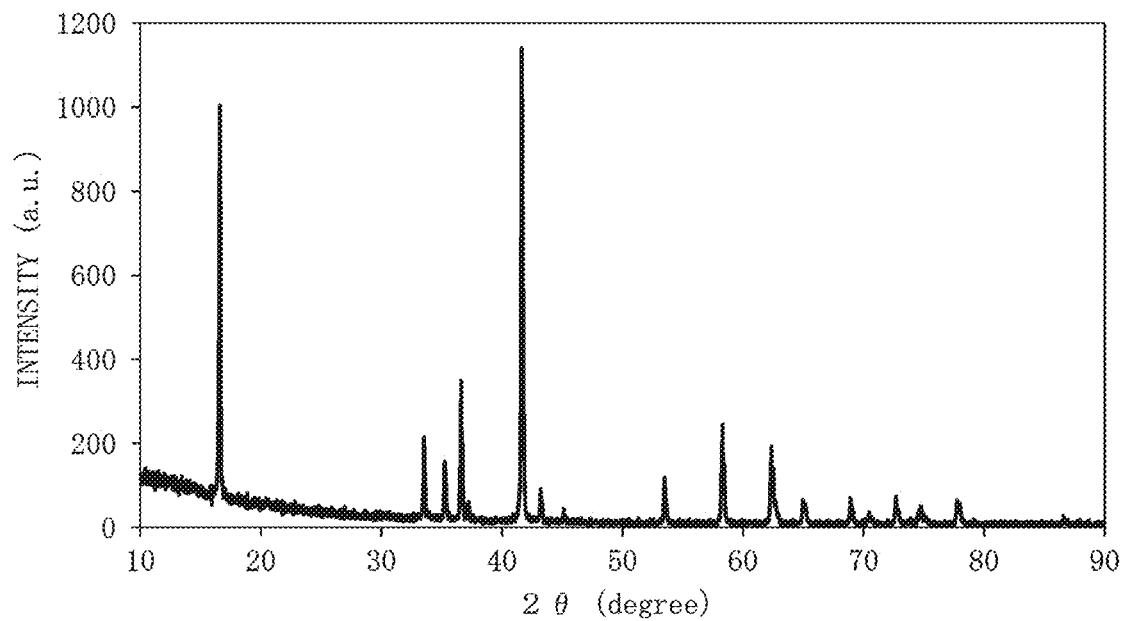
FIG. 9 is an XRD chart for an electrode active material of Example 6.

An agate mortar was charged with 292.2 mg of silica ($SiO_2$), sodium carbonate ($Na_2CO_3$), calcium hydroxide ($Ca(OH)_2$), manganese (IV) oxide ($MnO_2$), iron (II, III) oxide ($Fe_3O_4$), and nickel (II) oxide (NiO) were used as a metal-containing compound, 15.3 g of the compound in total was weighed such that the molar ratio of Na:Ca:Mn:Fe:Ni was set to 0.99:0.02:0.35:0.30:0.35, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 10. The electrode active material 10 was dissolved in hydrochloric acid, and the composition was analyzed based on ICP emission analysis. As the result, the molar ratio between the dissolved components (Na:Ca:Mn:Fe:Ni:Si) was 0.99:0.02: 0.35:0.30:0.35:0.003 ($Na_{0.98}Ca_{0.02}Mn_{0.35}Fe_{0.30}Ni_{0.35}Si_{0.003}O_2$). As determined by powder X-ray diffraction measurement performed on the electrode active material 10, the crystal structure of the electrode active material 10 belongs to a layered structure (FIG. 9). The peak intensity of the (200) plane of the by-product NiO was set as I, and the peak intensity of the composite metal oxide represented by Formula (1) was set as $I_0$, the value of $I/I_0$ obtained by dividing I by $I_0$ was 0.080. As determined by pH measurement performed on the electrode active material 10, the pH thereof was 12.4.

The mass of the silicon-containing compound in a case where the total mass of the sodium-containing compound, the nickel-containing compound, and the M-containing compound was set to 100 parts by mass is listed in Table 1.

Example 7

Figure 10:
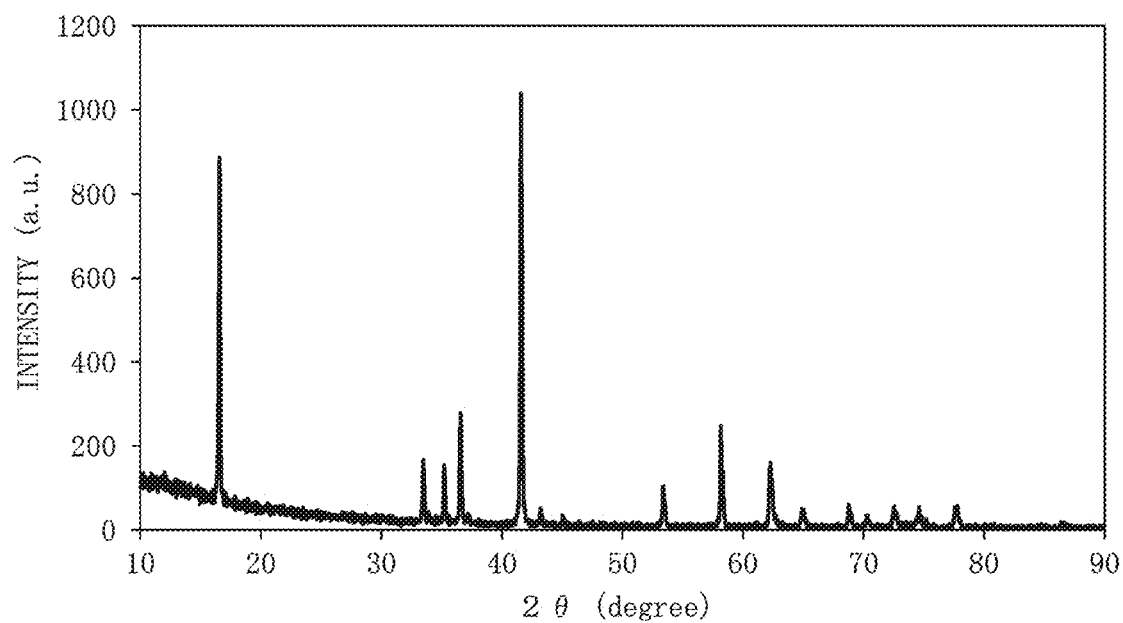
FIG. 10 is an XRD chart for an electrode active material of Example 7.

An agate mortar was charged with 291.2 mg of silica ($SiO_2$), sodium carbonate ($Na_2CO_3$), calcium hydroxide ($Ca(OH)_2$), manganese (IV) oxide ($MnO_2$), iron (II, III) oxide ($Fe_3O_4$), and nickel (II) oxide (NiO) were used as a metal-containing compound, 15.3 g of the compound in total was weighed such that the molar ratio of Na:Ca:Mn:Fe:Ni was set to 1.00:0.02:0.31:0.41:0.28, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 11. The electrode active material 11 was dissolved in hydrochloric acid, and the composition was analyzed based on ICP emission analysis. As the result, the molar ratio between the dissolved components (Na:Ca:Mn:Fe:Ni:Si) was 1.00:0.02:0.31:0.41: 0.28:0.001 ($Na_{1.00}Ca_{0.02}Mn_{0.31}Fe_{0.41}Ni_{0.28}Si_{0.001}O_2$). As determined by powder X-ray diffraction measurement performed on the electrode active material 11, the crystal structure of the electrode active material 11 belongs to a layered structure (FIG. 10). The peak intensity of the (200) plane of the by-product NiO was set as I, and the peak intensity of the composite metal oxide represented by Formula (1) was set as $I_0$, the value of $I/I_0$ obtained by dividing I by $I_0$ was 0.050. As determined by pH measurement performed on the electrode active material 11, the pH thereof was 12.2.

The mass of the silicon-containing compound in a case where the total mass of the sodium-containing compound, the nickel-containing compound, and the M-containing compound was set to 100 parts by mass is listed in Table 1.

Example 8

Figure 11:
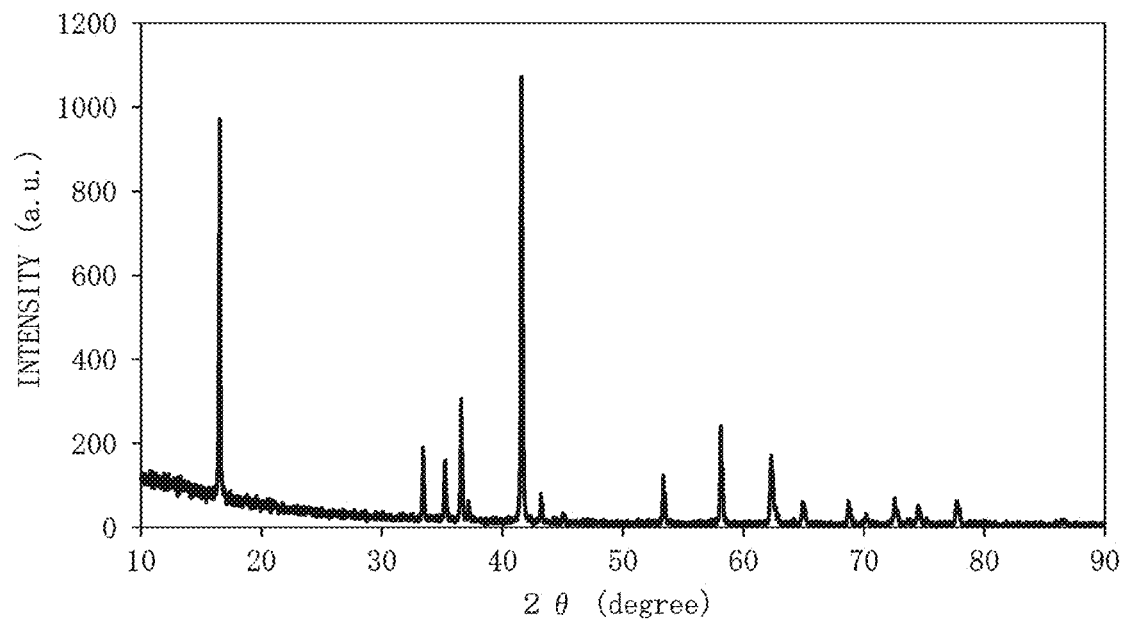
FIG. 11 is an XRD chart for an electrode active material of Example 8.

An agate mortar was charged with 291.1 mg of silica ($SiO_2$), sodium carbonate ($Na_2CO_3$), magnesium hydroxide ($Mg(OH)_2$), manganese (IV) oxide ($MnO_2$), iron (II, III) oxide ($Fe_3O_4$), and nickel (II) oxide (NiO) were used as a metal-containing compound, 15.3 g of the compound in total was weighed such that the molar ratio of Na:Mg:Mn:Fe:Ni was set to 0.99:0.02:0.31:0.41:0.28, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 12. The electrode active material 12 was dissolved in hydrochloric acid, and the composition was analyzed based on ICP emission analysis. As the result, the molar ratio between the dissolved components (Na:Mg:Mn:Fe:Ni:Si) was 0.99:0.02: 0.30:0.41:0.28:0.005 ($Na_{0.99}Mg_{0.02}Mn_{0.30}Fe_{0.41}Ni_{0.28}Si_{0.005}O_2$). As determined by powder X-ray diffraction measurement performed on the electrode active material 12, the crystal structure of the electrode active material 12 belongs to a layered structure (FIG. 11). The peak intensity of the (200) plane of the by-product NiO was set as I, and the peak intensity of the composite metal oxide represented by Formula (1) was set as $I_0$, the value of $I/I_0$ obtained by dividing I by $I_0$ was 0.075. As determined by pH measurement performed on the electrode active material 12, the pH thereof was 12.4.

The mass of the silicon-containing compound in a case where the total mass of the sodium-containing compound, the nickel-containing compound, and the M-containing compound was set to 100 parts by mass is listed in Table 1.

Example 9

Figure 12:
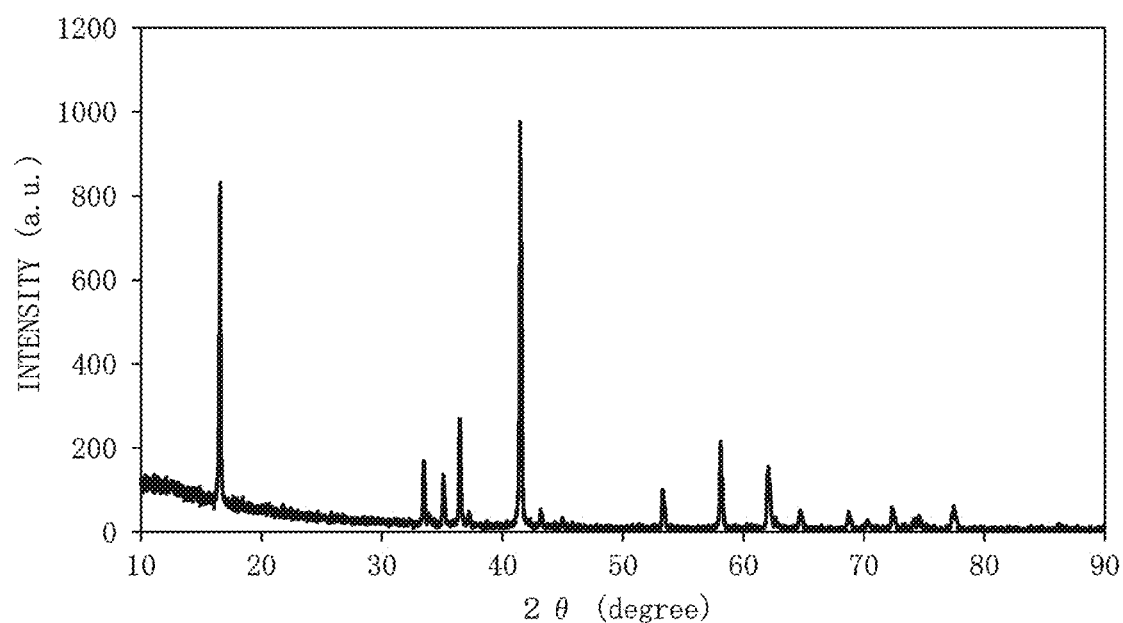
FIG. 12 is an XRD chart for an electrode active material of Example 9.

An agate mortar was charged with 290.8 mg of silica ($SiO_2$), sodium carbonate ($Na_2CO_3$), calcium hydroxide ($Ca(OH)_2$), manganese (IV) oxide ($MnO_2$), iron (II, III) oxide ($Fe_3O_4$), and nickel (II) oxide (NiO) were used as a metal-containing compound, 15.3 g of the compound in total was weighed such that the molar ratio of Na:Ca:Mn:Fe:Ni was set to 0.99:0.02:0.25:0.50:0.25, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 13. The electrode active material 13 was dissolved in hydrochloric acid, and the composition was analyzed based on ICP emission analysis. As the result, the molar ratio between the dissolved components (Na:Ca:Mn:Fe:Ni:Si) was 0.99:0.02:0.25:0.50:0.25:0.001 ($Na_{0.99}Ca_{0.02}Mn_{0.25}Fe_{0.50}Ni_{0.25}Si_{0.001}O_2$). As determined by powder X-ray diffraction measurement performed on the electrode active material 13, the crystal structure of the electrode active material 13 belongs to a layered structure (FIG. 12). The peak intensity of the (200) plane of the by-product NiO was set as I, and the peak intensity of the composite metal oxide represented by Formula (1) was set as $I_0$, the value of $I/I_0$ obtained by dividing I by $I_0$ was 0.055. As determined by pH measurement performed on the electrode active material 13, the pH thereof was 12.3.

The mass of the silicon-containing compound in a case where the total mass of the sodium-containing compound, the nickel-containing compound, and the M-containing compound was set to 100 parts by mass is listed in Table 1.

Example 10

Figure 13:
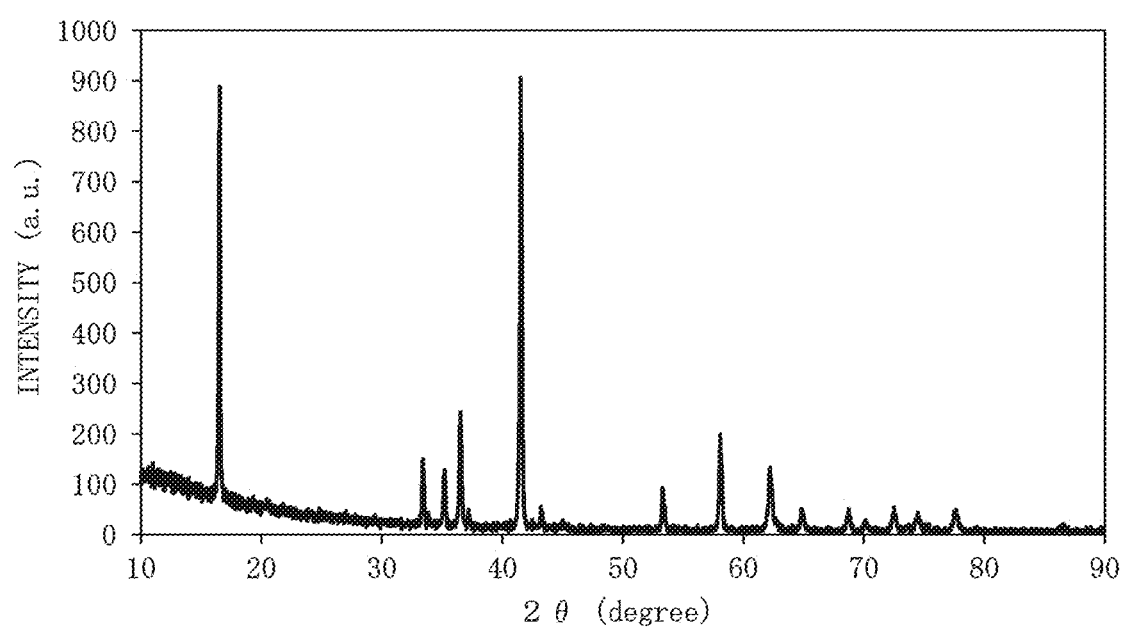
FIG. 13 is an XRD chart for an electrode active material of Example 10.

An agate mortar was charged with 291.6 mg of silica ($SiO_2$), sodium carbonate ($Na_2CO_3$), calcium hydroxide ($Ca(OH)_2$), manganese (IV) oxide ($MnO_2$), iron (III) oxide ($Fe_2O_3$), nickel (II) oxide (NiO), and titanium (IV) oxide (anatase, $TiO_2$) were used as a metal-containing compound, 15.3 g of the compound in total was weighed such that the molar ratio of Na:Ca:Mn:Fe:Ni:Ti was set to 0.99:0.02:0.26:0.41:0.28:0.05, and the agate mortar was charged with the compound and dry-mixed to obtain a mixture. An alumina crucible was filled with the obtained mixture and heated in the air atmosphere using an electric furnace, the state was held at 900° C. for 12 hours, and the mixture was calcined and cooled to room temperature, thereby obtaining an electrode active material 14. The electrode active material 14 was dissolved in hydrochloric acid, and the composition was analyzed based on ICP emission analysis. As the result, the molar ratio between the dissolved components (Na:Ca:Mn:Fe:Ni:Ti:Si) was 0.99:0.02:0.26:0.41:0.28:0.05:0.003 ($Na_{0.99}Ca_{0.02}Mn_{0.26}Fe_{0.41}Ni_{0.28}Ti_{0.05}Si_{0.003}O_2$). As determined by powder X-ray diffraction measurement performed on the electrode active material 14, the crystal structure of the electrode active material 14 belongs to a layered structure (FIG. 13). The peak intensity of the (200) plane of the by-product NiO was set as I, and the peak intensity of the composite metal oxide represented by Formula (1) was set as $I_0$, the value of $I/I_0$ obtained by dividing I by $I_0$ was 0.062. As determined by pH measurement performed on the electrode active material 14, the pH thereof was 12.2.

The mass of the silicon-containing compound in a case where the total mass of the sodium-containing compound, the nickel-containing compound, and the M-containing compound was set to 100 parts by mass is listed in Table 1.

The results of Examples 1 to 10 and Comparative Examples 1 to 4 are collectively listed in Tables 1 and 2. In Table 1, the "mixed mass of the silicon-containing compound" indicates the amount (parts by mass) of the silicon-containing compound to be mixed with respect to 100 parts by mass which is the total mass of the sodium-containing compound, the nickel-containing compound, and the M-containing compound.

TABLE 1

| | Composition of composite metal oxide | Mixed weight of silicon-containing compound |
|---|---|---|
| Example 1 | $Na_{0.98}Ca_{0.02}Mn_{0.30}Fe_{0.41}Ni_{0.28}Si_{0.01}O_2$ | 0.9 |
| Example 2 | $Na_{0.97}Ca_{0.02}Mn_{0.30}Fe_{0.40}Ni_{0.27}Si_{0.02}O_2$ | 1.4 |
| Example 3 | $Na_{0.98}Ca_{0.02}Mn_{0.30}Fe_{0.41}Ni_{0.28}Si_{0.01}O_2$ | 1.9 |
| Example 4 | $Na_{0.97}Ca_{0.02}Mn_{0.30}Fe_{0.41}Ni_{0.27}Si_{0.02}O_2$ | 2.3 |
| Example 5 | $Na_{0.98}Mn_{0.30}Fe_{0.42}Ni_{0.27}Si_{0.01}O_2$ | 1.9 |
| Example 6 | $Na_{0.99}Ca_{0.02}Mn_{0.35}Fe_{0.30}Ni_{0.35}Si_{0.003}O_2$ | 1.9 |
| Example 7 | $Na_{1.00}Ca_{0.02}Mn_{0.31}Fe_{0.41}Ni_{0.28}Si_{0.001}O_2$ | 1.9 |
| Example 8 | $Na_{0.99}Mg_{0.02}Mn_{0.30}Fe_{0.41}Ni_{0.28}Si_{0.005}O_2$ | 1.9 |
| Example 9 | $Na_{0.99}Ca_{0.02}Mn_{0.25}Fe_{0.50}Ni_{0.25}Si_{0.001}O_2$ | 1.9 |
| Example 10 | $Na_{0.99}Ca_{0.02}Mn_{0.26}Fe_{0.41}Ni_{0.28}Ti_{0.05}Si_{0.003}O_2$ | 1.9 |
| Comparative Example 1 | $Na_{0.99}Mn_{0.31}Fe_{0.41}Ni_{0.08}O_2$ | None |
| Comparative Example 2 | $Na_{0.99}Ca_{0.02}Mn_{0.31}Fe_{0.41}Ni_{0.28}O_2$ | None |
| Comparative Example 3 | $Na_{1.04}Mn_{0.30}Fe_{0.42}Ni_{0.27}Si_{0.01}O_2$ | 4.7 |
| Comparative Examnle 4 | $Na_{0.98}Ca_{0.03}Mn_{0.30}Fe_{0.41}Ni_{0.27}Ti_{0.01}Zn_{0.003}Al_{0.002}O_2$ | None |

TABLE 2

| | pH | Coatability | $I/I_0$ |
|---|---|---|---|
| Example 1 | 12.5 | ○ | 0.033 |
| Example 2 | 12.4 | ○ | 0.032 |
| Example 3 | 12.3 | ○ | 0.045 |
| Example 4 | 12.5 | ○ | 0.068 |
| Example 5 | 12.4 | ○ | 0.053 |
| Example 6 | 12.4 | ○ | 0.080 |
| Example 7 | 12.2 | ○ | 0.050 |
| Example 8 | 12.4 | ○ | 0.075 |
| Example 9 | 12.3 | ○ | 0.055 |
| Example 10 | 12.2 | ○ | 0.062 |
| Comparative Example 1 | 12.9 | x | — |
| Comparative Example 2 | 13.0 | x | — |
| Comparative Example 3 | 12.8 | x | 0.215 |
| Comparative Example 4 | 12.7 | x | — |

As shown in the results, the coatabilities of Examples 1 to 10 were all evaluated as "○". On the contrary, the coatabilities of Comparative Examples 1 and 2 were evaluated as "x". It was speculated that since the results of pH in Comparative Examples 1 and 2 were high, sodium hydroxide was formed from the reaction with the moisture in air due to low water resistance. In Comparative Example 3 in which the amount of the silicon-containing compound to be added was set to be greater than the range of the present invention, the value of $I/I_0$ was high, in other words, the amount of nickel oxide to be generated on the surface of the electrode active material was large. In Comparative Example 4 in which alumina was used in place of the silicon-containing compound, the pH was higher than those of Examples 1 to 10, and the coatability was evaluated as "x".

Figure 8A:
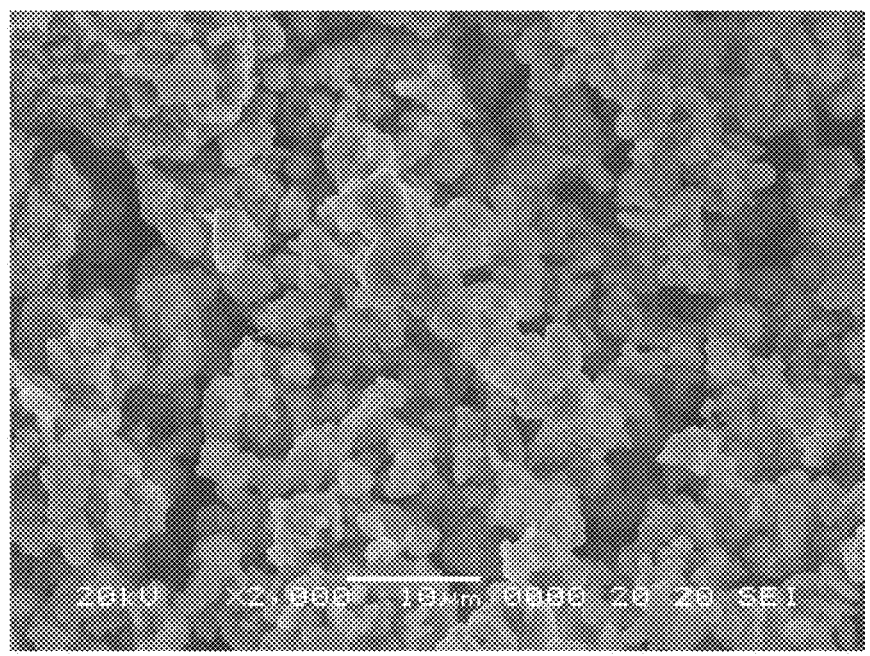
FIG. 8A is an SEM photomicrograph of the electrode active material produced in Example 5.
Figure 8B:
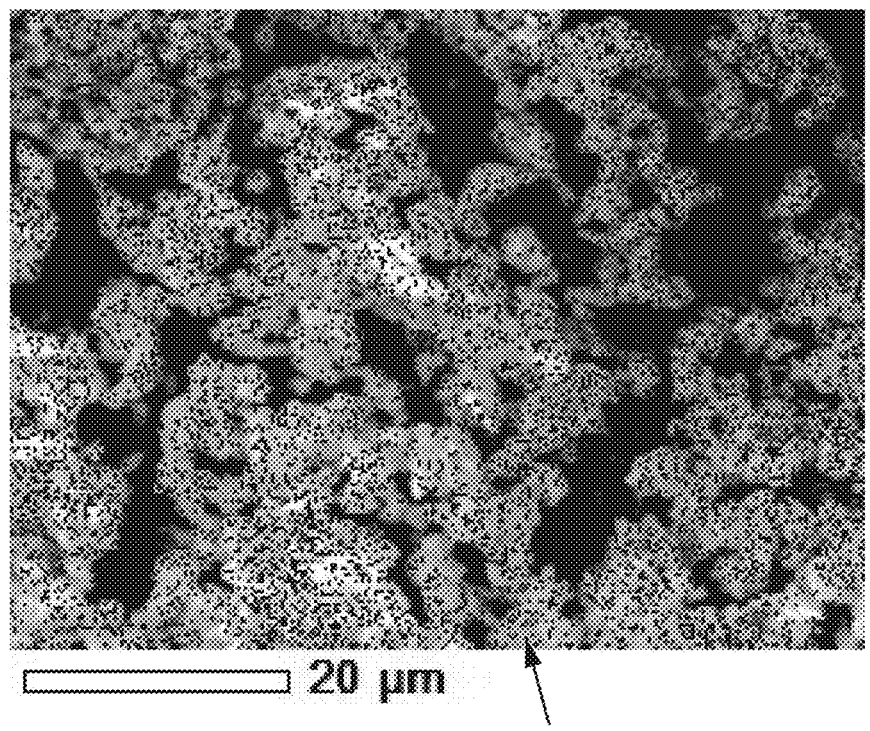
FIG. 8B is an SEM-EDX photomicrograph of the electrode active material produced in Example 5.

The SEM photomicrograph of Example 5 is shown in FIG. 8A, and the SEM-EDX photomicrograph of Example 5 is shown in FIG. 8B. In FIG. 8B, the fine black dots indicated by the arrow are uniformly dispersed silicon. As shown in FIG. 8B, silicon was uniformly dispersed in the composite metal oxide produced in the present invention.

REFERENCE SIGNS LIST

1: separator
2: positive electrode
3: negative electrode
4: electrode group
5: battery can
6: electrolytic solution
7: top insulator
8: sealing member
10: sodium secondary battery
21: lead
31: lead

What is claimed is:

1. An electrode active material for a sodium secondary battery, comprising:
a composite metal oxide,
wherein the electrode active material has an α-NaFeO$_2$ type crystal structure, which is a layered rock salt type crystal structure, $$Na_aM^1{}_rM_bNi_eSi_cO_d \quad (1)$$

where M represents one or more elements selected from the group consisting of B, Ti, Mn, Fe, and Co, M$^1$ represents one or more elements selected from the group consisting of Mg, Ca, and Sr, and relations 0≤r≤0.1, 0.5≤a≤1.0, 0<c<0.1, 0.5<b+c≤1.1, 0<e≤0.5, and 1.95<d<2.05 are satisfied, and
where a peak intensity of a (200) plane of nickel oxide of a powder X-ray diffraction spectrum using CuKα radiation is set as I, and a peak intensity of a (104) plane of the composite metal oxide represented by Formula (1) is set as $I_0$, $I/I_0$ obtained by dividing I by $I_0$ is greater than or equal to 0.015 and less than or equal to 0.1 or less.

2. The electrode active material for a sodium secondary battery according to claim 1,
wherein M in Formula (1) contains at least one element selected from the group consisting of Ti, Mn, and Fe.

3. The electrode active material for a sodium secondary battery according to claim 1,
wherein a crystal structure of the composite metal oxide represented by Formula (1) has a layered structure.

4. An electrode comprising:
the electrode active material for a sodium secondary battery according to claim 1.

5. A sodium secondary battery comprising:
the electrode according to claim 4.

6. A method for producing a composite metal oxide, comprising:
a mixing step of mixing a Na-containing compound, a Ni-containing compound, an M-containing compound (M represents any one or more elements selected from the group consisting of B, Ti, Mn, Fe, and Co), and a Si-containing compound to obtain a mixture; and
a calcination step of calcining powder containing the mixture,
wherein the mixing is carried out such that a mass of the Si-containing compound is set to be greater than 0 and less than or equal to 3 parts by mass in a case where a total mass of the Na-containing compound, the Ni-containing compound, and the M-containing compound is set to 100 parts by mass,
wherein the electrode active material has an α-NaFeO$_2$ type crystal structure which is a layered rock salt type crystal structure,
wherein the composite metal oxide is represented by Formula (1):

$$Na_aM^1{}_rM_bNi_eSi_cO_d \quad (1)$$

where M represents one or more elements selected from the group consisting of B, Ti, Mn, Fe, and Co, M$^1$ represents one or more elements selected from the group consisting of Mg, Ca, and Sr, and relations 0≤r≤0.1, 0.5≤a≤1.0, 0<c<0.1, 0.5<b+c≤1.1, 0<e≤0.5, and 1.95<d<2.05 are satisfied, and
where a peak intensity of a (200) plane of nickel oxide of a powder X-ray diffraction spectrum using CuKα radiation is set as I, and a peak intensity of a (104) plane of the composite metal oxide represented by Formula (1) is set as $I_0$, $I/I_0$ obtained by dividing I by $I_0$ is greater than or equal to 0.015 and less than or equal to 0.1 or less.

7. The method for producing a composite metal oxide according to claim 6,
wherein the Si-containing compound is a silicon-containing oxide.

8. The method for producing a composite metal oxide according to claim 6,
wherein the M-containing compound contains at least one element selected from the group consisting of Ti, Mn, and Fe.

9. The method for producing a composite metal oxide according to claim 6,
wherein a calcination temperature in the calcination step is higher than or equal to 800° C. and lower than or equal to 1000° C.

10. The method for producing a composite metal oxide according to claim 9,
wherein a holding time at the temperature higher than or equal to 800° C. and lower than or equal to 1000° C. in the calcination step is longer than or equal to 4 hours and shorter than or equal to 20 hours.

* * * * *